United States Patent
Lu et al.

(10) Patent No.: US 11,199,820 B2
(45) Date of Patent: Dec. 14, 2021

(54) CUSTOMIZED HARMONIC REPETITIVE CONTROLLER AND CONTROL METHOD

(71) Applicant: Jiangnan University, Wuxi (CN)

(72) Inventors: Wenzhou Lu, Wuxi (CN); Haiying Chen, Wuxi (CN); Wei Wang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 17/308,110

(22) Filed: May 5, 2021

(65) Prior Publication Data

US 2021/0255592 A1    Aug. 19, 2021

Related U.S. Application Data

(63) Continuation of application No. PCT/CN2020/127928, filed on Nov. 11, 2020.

(30) Foreign Application Priority Data

Jan. 19, 2020 (CN) .......................... 202010057203X

(51) Int. Cl.
G05B 13/04 (2006.01)
(52) U.S. Cl.
CPC .................................. *G05B 13/045* (2013.01)
(58) Field of Classification Search
None
See application file for complete search history.

(56) References Cited

U.S. PATENT DOCUMENTS

2008/0167735 A1 * 7/2008 Escobar Valderrama ................... G05B 5/01 700/45

FOREIGN PATENT DOCUMENTS

| CN | 101887238 A | 11/2010 |
|---|---|---|
| CN | 101937193 A | 1/2011 |
| CN | 102135758 A | 7/2011 |
| CN | 102176115 A | 9/2011 |
| CN | 102200758 A | 9/2011 |
| CN | 105159062 A | 12/2015 |
| CN | 105159064 A | 12/2015 |
| CN | 111142389 A | 5/2020 |

* cited by examiner

*Primary Examiner* — Carlos R Ortiz Rodriguez
(74) *Attorney, Agent, or Firm* — Ipro, PLLC; Na Xu

(57) ABSTRACT

The disclosure discloses a customized harmonic repetitive controller and a control method, and belongs to the field of repetitive controllers for industrial control. In the repetitive controller, a periodic signal generator formed by three time-delay modules and a positive feedforward gain module is taken as a whole to form a forward path, and an internal model of a periodic signal is constructed in the form of outputting positive feedback. Therefore, the structure of the repetitive controller conforms to a standard internal model construction method, the repetitive controller has an order expanding capability, the flexibility of the controller is greatly improved, the disturbance canceling speed of the controller is increased, and the repetitive controller is simple in structure and convenient to design. An h-order nk±m-order-harmonic repetitive controller (h≥2) obtained by further expansion covers various existing high-order repetitive controllers, and a unified form is provided to make the repetitive controller universal.

7 Claims, 22 Drawing Sheets

CUSTOMIZED HARMONIC REPETITIVE CONTROLLER AND CONTROL METHOD

TECHNICAL FIELD

The disclosure relates to a customized harmonic repetitive controller and a control method, and belongs to the field of repetitive controllers for industrial control.

BACKGROUND

Repetitive control is proposed to achieve high-precision tracking of periodic signals. In many industrial application scenarios, it is necessary to achieve high-precision tracking of periodic signals, such as some production occasions where AC power provided by a grid is not directly used as a power source, and electric energy required to meet the respective production occasions is obtained by various forms of electric energy conversion. In the electric energy conversion process, inverter equipment is required. The inverter equipment may receive the disturbance of external signals, so an advanced control method is required to achieve high-precision control, and repetitive control may achieve the purpose.

The repetitive control is simply referred to that in addition to a deviation signal, a "past control deviation", which is a control deviation at this moment of the previous period, is also added to an input signal of a controlled object. The deviation from the previous running is reflected to the present and added to the controlled object together with a "present deviation" for control. In this control mode, the deviation is repeatedly used, and is called repetitive control. After the repetitive control for several periods, the tracking precision of a system can be greatly improved, and the quality of the system can be improved. The control method not only is suitable for tracking periodic input signals, but also may be used for suppressing periodic interference. A repetitive controller is generally composed of three parts: a repetitive signal generator internal model, a periodic delay link and a compensator.

A traditional repetitive controller adopts a positive feedback form of a delay link (i.e. a periodic signal generator) with the delay time $\tau$ of $T_0$ to construct an internal model of a periodic signal with a fundamental period of $T_0$, and embeds the internal model into a control loop so as to achieve static error-free tracking control or disturbance cancellation on the periodic signal (including a sinusoidal fundamental wave and various harmonics thereof). But because the delay time of the repetitive controller from input to output is the fundamental period $T_0$, the response speed of the repetitive controller is relatively low. In practice, the repetitive controller achieves the internal model of the periodic signal mainly in a digital mode $z^{-N}(1-z^{-N})$ (where $N=T_0/T_s$ is an integer and $T_s$ is the sampling time), and the number of occupied memory units is at least $N_0$. Therefore, the dynamic response of the traditional repetitive controller is slow.

In order to improve the dynamic performance of the repetitive controller, there is a complex control strategy that combines a repetitive controller with other control methods. Although effective, this method greatly increases the difficulty and complexity of controller design, and in some practical applications, harmonics that need to be tracked or canceled are limited to certain specific frequencies. For example, the harmonic pollution to a power system caused by three-phase rectifier loads is mostly concentrated at $6k\pm1$ ($k=1, 2, \ldots$)-order-harmonic frequencies, while the harmonic pollution to the power system caused by single-phase rectifier loads is mostly concentrated at $4k\pm1$ ($k=1, 2, \ldots$)-order-harmonic frequencies (i.e. odd-harmonic frequencies). In industrial occasions, the two types of harmonics dominate. If a general repetitive controller is adopted to cancel such $nk\pm m$-order harmonics, the periodic disturbance may be canceled very slowly, so the practical requirements of the system for control performance cannot be met.

In view of the need to cancel specific $nk\pm m$-order harmonics, some scholars have proposed an $nk\pm m$ RC-order harmonic repetitive controller ($nk\pm m$ RC), i.e. an $nk\pm m$ RC proposed by Wenzhou Lu et al. in the paper "A Generic Digital $nk\pm m$-Order Harmonic Repetitive Control Scheme for PWM Converters", IEEE Transactions on Industrial Electronics, 2013, which solves the above problem. However, in practical application, if a reference voltage frequency/grid voltage frequency/digital control system sampling frequency changes, mismatch between a controller internal model and a periodic signal will occur. At this moment, if the $nk\pm m$ RC proposed by Wenzhou Lu et al. is adopted, since order expansion cannot be achieved, the problem of mismatch between the controller internal model and the periodic signal cannot be solved, which leads to the reduction of harmonic suppression performance, the increase of steady-state error, the increase of distortion, and the great decrease of control performance.

According to the existing high-order repetitive control theory, a high-order repetitive controller has the ability to cope with the frequency variation, i.e. has the ability to cope with the mismatch between the controller internal model and the periodic signal. Therefore, expanding the order of the controller is an effective way to solve the problem of internal model mismatch. However, the structure of the $nk\pm m$ RC proposed by Wenzhou Lu et al. has a forward path leading ahead of an addition loop, and does not conform to a standard construction structure of the high-order repetitive controller, so the order cannot be expanded to improve the control performance, and the use of high-order $nk\pm m$ RC is limited.

Therefore, it is necessary to invent a novel $nk\pm m$ RC, which not only has the function of the traditional $nk\pm m$ RC, but also is more standard in structure and may achieve order expansion to deal with the problem of internal model mismatch in practical application, so as to improve the robustness and flexibility of the controller.

SUMMARY

In order to solve the problem that when an existing $nk\pm m$ RC faces the problem of internal model mismatch, a high-order repetitive controller cannot be constructed to improve the controller performance, the disclosure provides a customized harmonic repetitive controller and a control method.

A first objective of the disclosure is to provide a repetitive controller. The repetitive controller includes: a repetitive control gain module, a positive feedforward gain module, a subtraction loop, two addition loops, and three identical time-delay modules.

An input end of the repetitive control gain module is used as an input end of the repetitive controller; an output end of the repetitive control gain module is used as a first input end of the first addition loop; an output end of the first addition loop is used as a first input end of the second addition loop; an output end of the second addition loop is connected to the positive feedforward gain module and the first time-delay module in series respectively and then connected to a positive input end and a negative input end of the subtraction loop; an output end of the subtraction loop is connected to the second time-delay module in series and then connected to a second input end of the first addition loop which is also an output end of the repetitive controller; and an output end of the positive feedforward gain module is connected to the third time-delay module in series and then connected to a second input end of the second addition loop.

Alternatively, the repetitive controller further includes: low pass filters and a phase lead compensation module.

The three identical time-delay modules are connected to one low pass filter in series respectively, and the output end of the subtraction loop is connected to the second time-delay module in series and then connected to the phase lead compensation module.

Alternatively, a transfer function of the repetitive controller including the low pass filters and the phase lead compensation module is as follows:

$$G_{rc}(s) = \frac{c(s)}{e(s)} = k_{rc} \cdot \frac{\cos\left(\frac{2\pi m}{n}\right)e^{\frac{sT_0}{n}} \cdot Q(s) - Q^2(s)}{e^{\frac{2sT_0}{n}} - 2\cos\left(\frac{2\pi m}{n}\right)e^{\frac{sT_0}{n}} \cdot Q(s) + Q^2(s)} \cdot A(s)$$

or $$G_{rc}(z) = \frac{c(z)}{e(z)} = k_{rc} \cdot \frac{\cos\left(\frac{2\pi m}{n}\right)z^{\frac{N}{n}} \cdot Q(z) - Q^2(z)}{z^{\frac{2N}{n}} - 2\cos\left(\frac{2\pi m}{n}\right) \cdot z^{\frac{N}{n}} \cdot Q(z) + Q^2(z)} \cdot A(s)$$

where $Q(z)$ is the low pass filter, and $A(z)$ is the phase lead compensation module; $c(\ )$ is the output quantity of the repetitive controller; $e(\ )$ is the input quantity of the repetitive controller, i.e. the control error quantity of a control system; $k_{rc}$ is the repetitive control gain parameter; s is the Laplace variable of a continuous time system; and z is the variable of z transformation of a discrete time system; $N=T_0/T_s$ is an integer, $T_0$ is the fundamental period, $T_0=2\pi/\omega_0=1/f_0$, $f_0$ is the fundamental frequency, $\omega_0$ is the fundamental angular frequency; $T_s$ is the sampling period; n, k and m are integers not less than zero and $n\neq0$, $n>m$.

When the repetitive controller adopts an analog or digital time-delay module respectively, expressions corresponding to $c(\ )$ are $c(s)$ and $c(z)$ respectively; expressions corresponding to $e(\ )$ are $e(s)$ and $e(z)$ respectively; expressions corresponding to $Q(\ )$ are $Q(s)$ and $Q(z)$ respectively; and expressions corresponding to $A(\ )$ are $A(s)$ and $A(z)$ respectively.

Alternatively, the low pass filter is a zero-phase low pass filter.

Alternatively, the repetitive control gain module is a proportionality constant for adjusting the speed of the repetitive controller to track or cancel specific harmonics, i.e. a convergence speed of an error between an output signal of the repetitive controller and a reference signal.

A second objective of the disclosure is to provide a multi-mode repetitive controller. The multi-mode repetitive controller is formed by parallel addition of at least two of the above repetitive controllers.

A third objective of the disclosure is to provide an h-order repetitive controller ($h\geq2$). The h-order repetitive controller is obtained by expanding the above repetitive controller using the following method: accumulating $\Sigma w_h M^h(\ )$ from 1 to h as a controller forward path, and constructing an internal model of a periodic signal in the form of outputting positive feedback; $w_h$ is a constant coefficient, and $M(\ )$ is a periodic signal generator formed by three time-delay modules and a positive feedforward gain module.

Alternatively, a transfer function of the periodic signal generator $M(\ )$ of the h-order repetitive controller is as follows:

$$M(s) = \frac{e^{-\frac{sT_0}{n}}\left[\cos\left(\frac{2\pi m}{n}\right) - e^{-\frac{sT_0}{n}}\right]}{1 - e^{-\frac{sT_0}{n}}\cos\left(\frac{2\pi m}{n}\right)} = \frac{e^{\frac{sT_0}{n}}\cos\left(\frac{2\pi m}{n}\right) - 1}{e^{\frac{2sT_0}{n}} - e^{\frac{sT_0}{n}}\cos\left(\frac{2\pi m}{n}\right)}$$

or $$M(z) = \frac{z^{-\frac{N}{n}}\left[\cos\left(\frac{2\pi m}{n}\right) - z^{-\frac{N}{n}}\right]}{1 - z^{-\frac{N}{n}}\cos\left(\frac{2\pi m}{n}\right)} = \frac{z^{\frac{N}{n}}\cos\left(\frac{2\pi m}{n}\right) - 1}{z^{\frac{2N}{n}} - z^{\frac{N}{n}}\cos\left(\frac{2\pi m}{n}\right)}$$

$M(s)$ is the transfer function of the periodic signal generator $M(\ )$ of the h-order repetitive controller when the repetitive controller adopts an analog time-delay module, and $M(z)$ is the transfer function of the periodic signal generator $M(\ )$ of the h-order repetitive controller when the repetitive controller adopts a digital time-delay module.

A fourth objective of the disclosure is to provide a converter. The converter is controlled by the above repetitive controller, or the above multi-mode repetitive controller, or the above h-order repetitive controller. The converter includes an inverter and a rectifier.

A fifth objective of the disclosure is to provide a control method of a repetitive controller. The method is used for canceling $nk\pm m$-order harmonics using the above repetitive controller or the above multi-mode repetitive controller or the above h-order repetitive controller; n, k and m are integers not less than zero and $n\neq0$, $n>m$. The method includes:

using a repetitive control gain module to perform repetitive control gain on an input quantity of the repetitive controller to obtain an output quantity of the repetitive control gain module;

using a positive feedforward gain module to perform positive feedforward gain on an output quantity of a second addition loop to obtain an output quantity of the positive feedforward gain module;

using a first addition loop to add the output quantity of the repetitive control gain module and an output quantity of a subtraction loop output by a second time-delay module in a delay manner to obtain an output quantity of the first addition loop;

using the second addition loop to add the output quantity of the first addition loop and the output quantity of the positive feedforward gain module output by a third time-delay module in a delay manner to obtain an output quantity of the second addition loop;

using the subtraction loop to subtract the output quantity of the positive feedforward gain module from the output quantity of the second addition loop output by a first time-delay module in a delay manner to obtain the output quantity of the subtraction loop;

using the first time-delay module to output the output quantity of the second addition loop in a delay manner;

using the second time-delay module to output the output quantity of the subtraction loop in a delay manner; and using the third time-delay module to output the output quantity of the positive feedforward gain module in a delay manner.

Alternatively, the method further includes:

adjusting the repetitive control gain to adjust the speed of the repetitive controller to track or cancel specific harmonics, i.e. a convergence speed of an error between an output signal of the repetitive controller and a reference signal.

Alternatively, the method further includes:

determining parameters of the positive feedforward gain module according to the order of harmonics to be tracked or canceled.

Alternatively, the time-delay module is an analog or digital time-delay module, and a transfer function of the repetitive controller is as follows:

$$G_{rc}(s) = \frac{c(s)}{e(s)} = k_{rc} \cdot \frac{\cos\left(\frac{2\pi m}{n}\right) \cdot e^{\frac{sT_0}{n}} - 1}{e^{\frac{2sT_0}{n}} - 2\cos\left(\frac{2\pi m}{n}\right) \cdot e^{\frac{sT_0}{n}} + 1}$$

or $$G_{rc}(z) = \frac{c(z)}{e(z)} = k_{rc} \cdot \frac{\cos\left(\frac{2\pi m}{n}\right) \cdot z^{\frac{N}{n}} - 1}{z^{\frac{2N}{n}} - 2\cos\left(\frac{2\pi m}{n}\right) \cdot z^{\frac{N}{n}} + 1}$$

c( ) is the output quantity of the repetitive controller; e( ) is the input quantity of the repetitive controller, i.e. the control error quantity of a control system; $k_{rc}$ is the repetitive control gain parameter; s is the Laplace variable of a continuous time system; and z is the variable of z transformation of a discrete time system; $N=T_0/T_s$ is an integer, $T_0$ is the fundamental period, $T_0=2\pi/\omega_0=1/f_0$, $f_0$ is the fundamental frequency, $\omega_0$ is the fundamental angular frequency, $T_s$ is the sampling period; n, k and m are integers not less than zero and $n\neq 0$, $n>m$.

When the repetitive controller adopts an analog or digital time-delay module respectively, expressions corresponding to c( ) are c(s) and c(z) respectively; and expressions corresponding to e( ) are e(s) and e(z) respectively.

Alternatively, the method further includes: adding the above repetitive controller to a feedback control system in an insertion manner for canceling nk±m-order harmonics components in control errors; when the repetitive controller is added to the feedback control system in the insertion manner, the transfer function of the repetitive controller is:

$$G_{rc}(z) = \frac{k_{rc}}{2}\left[\frac{e^{j2\pi m/n} \cdot z^{-N/n} \cdot Q(z)}{1 - e^{j2\pi m/n} \cdot z^{-N/n} \cdot Q(z)} + \frac{e^{-j2\pi m/n} \cdot z^{-N/n} \cdot Q(z)}{1 - e^{-j2\pi m/n} \cdot z^{-N/n} \cdot Q(z)}\right] \cdot A(z)$$

Q(z) is a low pass filter, and A(z) is a phase lead compensation module.

The feedback control system is stable when the following two conditions are met:

(1) poles of a transfer function of a closed-loop system before the repetitive controller is inserted are located in a unit circle; and (2) the repetitive control gain parameter $k_{rc}$ in the inserted controller meets $0<k_{rc}<2$.

The disclosure has the following beneficial effects:

1. The structure of the repetitive controller provided by the disclosure conforms to a standard internal model construction method, i.e. the periodic signal generator formed by three time-delay modules and the positive feedforward gain module is taken as a whole to form the forward path, and the internal model of the periodic signal is constructed in the form of outputting positive feedback. According to the existing high-order repetitive control theory, a high-order repetitive controller may be formed only when the periodic signal generator is used as a unique forward path as a whole, and the internal model is constructed in the form of outputting positive feedback. In the repetitive controller provided by the disclosure, the periodic signal generator is used as the unique forward path as a whole, and the internal model is constructed in the form of outputting positive feedback, so that the repetitive controller has an order expanding capability, and the flexibility of the controller is greatly improved.

2. The h-order nk±m RC (h≥2) obtained by further expanding the repetitive controller provided by the disclosure covers various existing high-order repetitive controllers, and a unified form is provided. For example, a high-order basic repetitive controller applied in Dapeng Li et al. "Second-order RC: analysis, augmentation, and anti-frequency-variation for single-phase grid-tied inverter", IET Power Electronics, 2018, is a special case of the h-order nk±m RC of the disclosure when h=2, n=1, m=0. For another example, a high-order odd-harmonic repetitive controller applied in Ramos G A et al. "Power factor correction and harmonic compensation using second-order odd-harmonic repetitive control", IET control theory & applications, is a special case of the h-order nk±m RC of the disclosure when h=2, n=4, m=1. Therefore, the h-order nk±m RC provided by the disclosure has universality.

3. The h-order nk±m RC (h≥2) obtained by further expanding the repetitive controller provided by the disclosure has a higher error convergence speed, and has a certain suppression effect when an internal model and a periodic signal are mismatched near a resonance frequency point, so that the performance of the controller is improved.

4. The repetitive controller provided by the disclosure is specially used for carrying out error-free tracking or disturbance cancellation on nk±m-order-harmonic signals, and different n and m values may be customized according to actual requirements for canceling harmonic disturbance signals or tracking reference signals. For the requirements of canceling (6k±1)-order harmonics and tracking a fundamental reference signal in three-phase inversion, only n=6 and m=1 are needed. For the requirements of canceling odd-harmonics and tracking a fundamental reference signal in single-phase inversion, only n=4 and m=1 are needed. Moreover, three delay links in the repetitive controller provided by the disclosure are completely identical, the delay time τ of the delay links is equal to 1/n times of the fundamental period $T_0$, and the longest delay time path is composed of two of the delay links, so that the total delay time is $(2T_0/n)<T_0$. Therefore, the response speed of the repetitive controller provided by the disclosure is much higher than that of a general repetitive controller under the condition that the repetitive control gain $k_{rc}$ is the same, and the speed of disturbance cancellation is greatly increased.

5. The multi-mode repetitive controller provided by the disclosure may be used for canceling all harmonics or any harmonic and may independently adjust the control gain of each harmonic controller.

6. The repetitive controller provided by the disclosure only needs one positive feedforward coefficient module besides the three time-delay modules and the repetitive control gain module, so that the controller is simple in structure and convenient to design.

7. When the repetitive controller provided by the disclosure is used for canceling the disturbance that the ratio of two frequencies of nk±m and nk−m is not an integer multiple relationship, only one time-delay link is needed to construct a disturbance signal internal model, so that the design of the time-delay link in the repetitive controller is simplified.

8. The three delay links in the repetitive controller provided by the disclosure are completely identical, and the number of occupied memory units is N/n, so that the total number of memory units of the repetitive controller is (3N/n), and the number of occupied memory units of an nk±m-order-harmonic digital repetitive controller is greatly lower than that of a general digital repetitive controller.

BRIEF DESCRIPTION OF FIGURES

In order to more clearly illustrate the technical solutions of the examples of the disclosure, the drawings used in the description of the examples are briefly described below, and it is obvious that the drawings in the description below are only some examples of the disclosure, and a person of ordinary skill in the art can obtain other drawings from these drawings without any creative effort.

DETAILED DESCRIPTION

In order to make objectives, technical solutions, and advantages of the disclosure more apparent, implementations of the disclosure will be described in further detail with reference to the drawings.

Example 1

This example provides a repetitive controller. The repetitive controller includes: a repetitive control gain module, a positive feedforward gain module, a subtraction loop, two addition loops, and three identical time-delay modules.

An input end of the repetitive control gain module is used as an input end of the repetitive controller; an output end of the repetitive control gain module is used as a first input end of the first addition loop; an output end of the first addition loop is used as a first input end of the second addition loop; an output end of the second addition loop is connected to the positive feedforward gain module and the first time-delay module in series respectively and then connected to a positive input end and a negative input end of the subtraction loop; an output end of the subtraction loop is connected to the second time-delay module in series and then connected to a second input end of the first addition loop, which is also an output end of the repetitive controller; and an output end of the positive feedforward gain module is connected to the third time-delay module in series and then connected to a second input end of the second addition loop.

Figure 1:
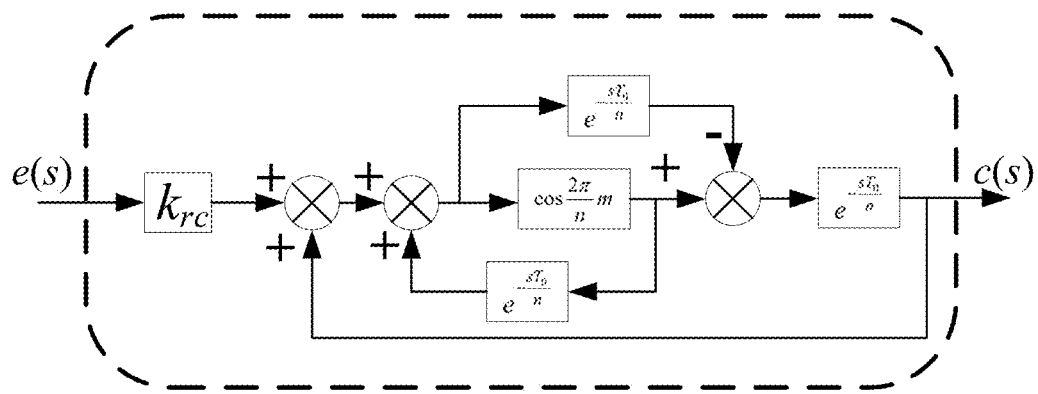
FIG. 1 is a structural block diagram of an nk±m RC according to the disclosure.

FIG. 1 shows a structural block diagram of a customized harmonic repetitive controller provided by the disclosure. c(s) is the output quantity of the repetitive controller; e(s) is the input quantity of the repetitive controller, i.e. the control error quantity of a control system; and $k_{rc}$ is the repetitive control gain module.

A transfer function of the customized harmonic repetitive controller is as follows:

$$G_{rc}(s) = \frac{c(s)}{e(s)} = k_{rc} \cdot \frac{\cos\left(\frac{2\pi m}{n}\right) \cdot e^{\frac{sT_0}{n}} - 1}{e^{\frac{2sT_0}{n}} - 2\cos\left(\frac{2\pi m}{n}\right) \cdot e^{\frac{sT_0}{n}} + 1} \quad (1)$$

In formula (1), $k_{rc}$ is the repetitive control gain parameter; $T_0$ is the fundamental period, $T_0 = 2\pi/\Omega_0 = 1/f_0$, $f_0$ is the fundamental frequency, $\omega_0$ is the fundamental angular frequency; n, k and m are integers not less than zero and n≠0, n>m; and e is a natural constant.

By adjusting the value of the gain coefficient $k_{rc}$, the error convergence speed of the system may be changed; the larger $k_{rc}$ is, the higher the steady-state error convergence speed of the system is, but the system will be out of a stable range due to over-large $k_{rc}$, so $k_{rc}$ can increase the convergence speed of the system only within a certain range.

Three delay links in FIG. 1 are completely identical, the delay time τ of the delay links is equal to 1/n times of the fundamental period $T_0$, and the longest delay time path is composed of two of the delay links, so that the total delay time is $(2T_0/n)<T_0$. Therefore, the response speed of the customized harmonic repetitive controller provided by the disclosure is much higher than that of a general repetitive controller under the condition that the repetitive control gain $k_{rc}$ is the same. This is a great advantage of the nk±m RC, and besides the three identical time-delay links and the repetitive control gain module, only one positive feedforward gain module exists in the controller, so that the controller is simple in structure and more convenient to design.

Formula (1) is transformed as follows:

$$G_{rc}(s) = k_{rc} \cdot \frac{\cos\left(\frac{2\pi m}{n}\right) \cdot e^{\frac{sT_0}{n}} - 1}{e^{\frac{2sT_0}{n}} - 2\cos\left(\frac{2\pi m}{n}\right) \cdot e^{\frac{sT_0}{n}} + 1} =$$

$$k_{rc} \cdot \frac{\cos\left(\frac{2\pi m}{n}\right) - e^{-\frac{sT_0}{n}}}{e^{\frac{sT_0}{n}} + e^{-\frac{sT_0}{n}} - 2\cos\left(\frac{2\pi m}{n}\right)} = \frac{1}{2} k_{rc} \cdot \frac{\cos\left(\frac{2\pi m}{n}\right) - e^{-\frac{sT_0}{n}}}{\cosh\left(\frac{sT_0}{n}\right) - \cos\left(\frac{2\pi m}{n}\right)} =$$

$$\frac{1}{2} k_{rc} \cdot \frac{\cos\left(\frac{2\pi m}{n}\right) - e^{-\frac{sT_0}{n}}}{2\sin^2\left(\frac{m\pi}{n}\right)\left(1 + \frac{s^2}{m^2\omega_0^2}\right) \cdot \prod_{k=1}^{\infty}\left\{\left[1 + \frac{s^2}{(nk+m)^2\omega_0^2}\right]\left[1 + \frac{s^2}{(nk-m)^2\omega_0^2}\right]\right\}}$$

The above formula requires m≠0.

When m=0, the transfer function of the repetitive controller for canceling nk±m-order harmonics may be formulated as follows:

$$G_{rc}(s) = \frac{c(s)}{e(s)} = k_{rc} \cdot \frac{\cos\left(\frac{2\pi m}{n}\right) \cdot e^{\frac{sT_0}{n}} - 1}{e^{\frac{2sT_0}{n}} - 2\cos\left(\frac{2\pi m}{n}\right) \cdot e^{\frac{sT_0}{n}} + 1}\bigg|_{m=0} =$$

$$k_{rc} \cdot \frac{e^{\frac{sT_0}{n}} - 1}{e^{\frac{2sT_0}{n}} - 2e^{\frac{sT_0}{n}} + 1} = k_{rc} \cdot \frac{e^{\frac{sT_0}{n}} - 1}{\left(e^{\frac{sT_0}{n}} - 1\right)^2} =$$

$$k_{rc} \cdot \frac{1}{e^{\frac{sT_0}{n}} - 1} = k_{rc} \cdot \frac{1}{(sT_0/n) \cdot e^{\frac{sT_0}{2n}} \cdot \prod_{k=1}^{\infty}[1 + s^2/(nk\omega_0)^2]}$$

By combining the above two formulae, it is thus obtained that a pole of the repetitive controller shown in FIG. 1 is at the frequency of $(nk\pm m)\omega_0$, i.e. the pole frequency is $m\omega 0$, $(n\pm m)\omega_0$, $(2n\pm m)\omega_0$, $(in\pm m)\omega_0$, ..., (where i=1, 2, 3 ...).

Since the gain of the repetitive controller is infinite at the frequency of $(nk\pm m)\omega_0$, harmonic components with the frequency of $(nk\pm m)\omega_0$ in the control error e(s) can be completely canceled, so that complete cancellation or error-free tracking of nk±m-order-harmonic disturbance is realized. Therefore, the repetitive controller, i.e. the customized harmonic repetitive controller provided by the disclosure is called an nk±m RC.

In practical application, m and n may be endowed with different values according to requirements of different occasions, so that error-free tracking or disturbance suppression of specific nk±m-order harmonics may be realized. For example, in the case of a three-phase inverter with three-phase rectifier loads, since harmonics are mainly concentrated at (6k±1) (i.e. 5, 7, 11, 13 and the like)-order-harmonic frequency components and it is often necessary to track a fundamental reference signal, it only needs to make n=6 and m=1, and error-free tracking of the fundamental reference signal and complete cancellation of (6k±1)-order-harmonics may be realized. In the case of a single-phase inverter with single-phase rectifier loads, since harmonics are mainly concentrated at (4k±1) (i.e. odd orders of 3, 5, 7, 9 and the like)-frequency components and it is often necessary to track a fundamental reference signal, it only needs to make n=4 and m=1, and error-free tracking of the fundamental reference signal and complete cancellation of odd-harmonics may be realized.

In practice, the repetitive controller is mostly implemented and applied digitally. The digital implementation corresponding to the repetitive controller shown in FIG. 1 is as shown in FIG. 2 with a transfer function as follows:

$$G_{rc}(z) = \frac{c(z)}{e(z)} = k_{rc} \cdot \frac{\cos\left(\frac{2\pi m}{n}\right) \cdot z^{\frac{N}{n}} - 1}{z^{\frac{2N}{n}} - 2\cos\left(\frac{2\pi m}{n}\right) \cdot z^{\frac{N}{n}} + 1}$$

c(z) is the output quantity of the repetitive controller; e(z) is the input quantity of the repetitive controller, i.e. the control error quantity of a control system; $k_{rc}$ is the repetitive control gain; $N=T_0/T_s$ is an integer, $T_0$ is the fundamental period, $T_0=2T/\omega_0=1/f_0$, $f_0$ is the fundamental frequency, $\omega_0$ is the fundamental angular frequency, $T_s$ is the sampling period; n, k and m are integers not less than zero and n≠0, n>m.

Figure 2:
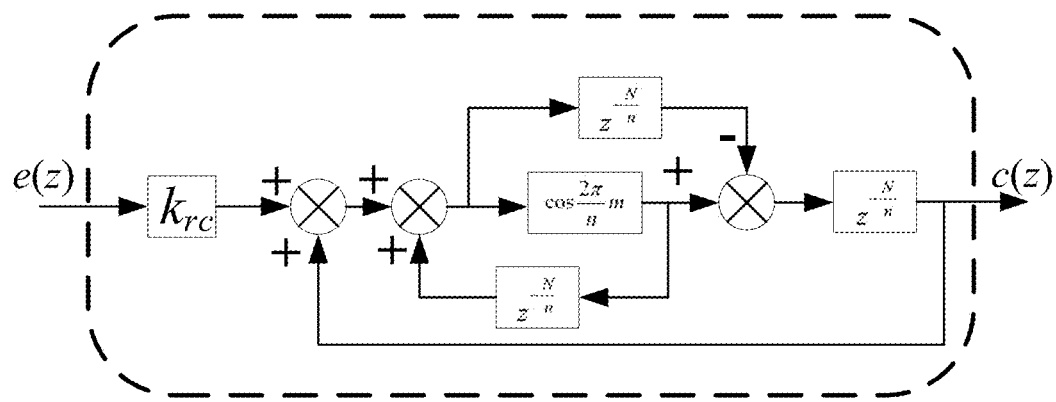
FIG. 2 is a digital implementation form of FIG. 1, and is a structural block diagram of an nk±m-order-harmonic digital repetitive controller.

Three time-delay links in FIG. 2 are completely identical, and the number of occupied memory units is N/n, so that the total number of memory units of the repetitive controller is (3N/n). Therefore, the nk±m-order-harmonic digital repetitive controller occupies much less memory space than a general digital repetitive controller.

Figure 3:
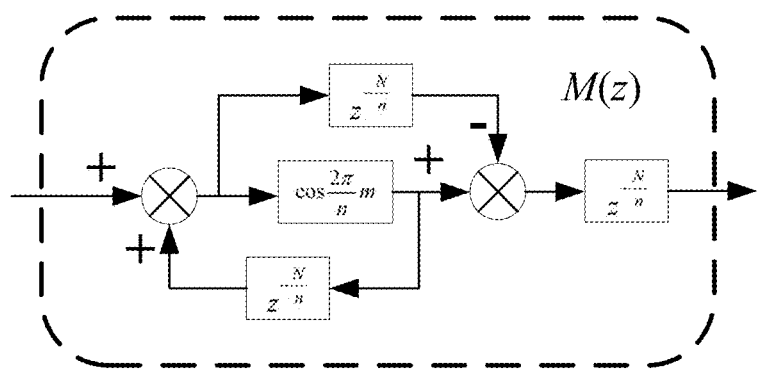
FIG. 3 is a structural block diagram of a periodic signal generator in a forward path in a digital form of an nk±m RC according to the disclosure.

FIG. 3 shows a digital form of a periodic signal generator in a forward path in an nk±m RC according to the disclosure, which is composed of three completely-identical time-delay modules and a positive feedforward gain module. A transfer function M(z) may be expressed as follows:

$$M(z) = \frac{z^{-\frac{N}{n}}\left[\cos\left(\frac{2\pi m}{n}\right) - z^{-\frac{N}{n}}\right]}{1 - z^{-\frac{N}{n}}\cos\left(\frac{2\pi m}{n}\right)} = \frac{z^{\frac{N}{n}}\cos\left(\frac{2\pi m}{n}\right) - 1}{z^{\frac{2N}{n}} - z^{\frac{N}{n}}\cos\left(\frac{2\pi m}{n}\right)}$$

Figure 4:
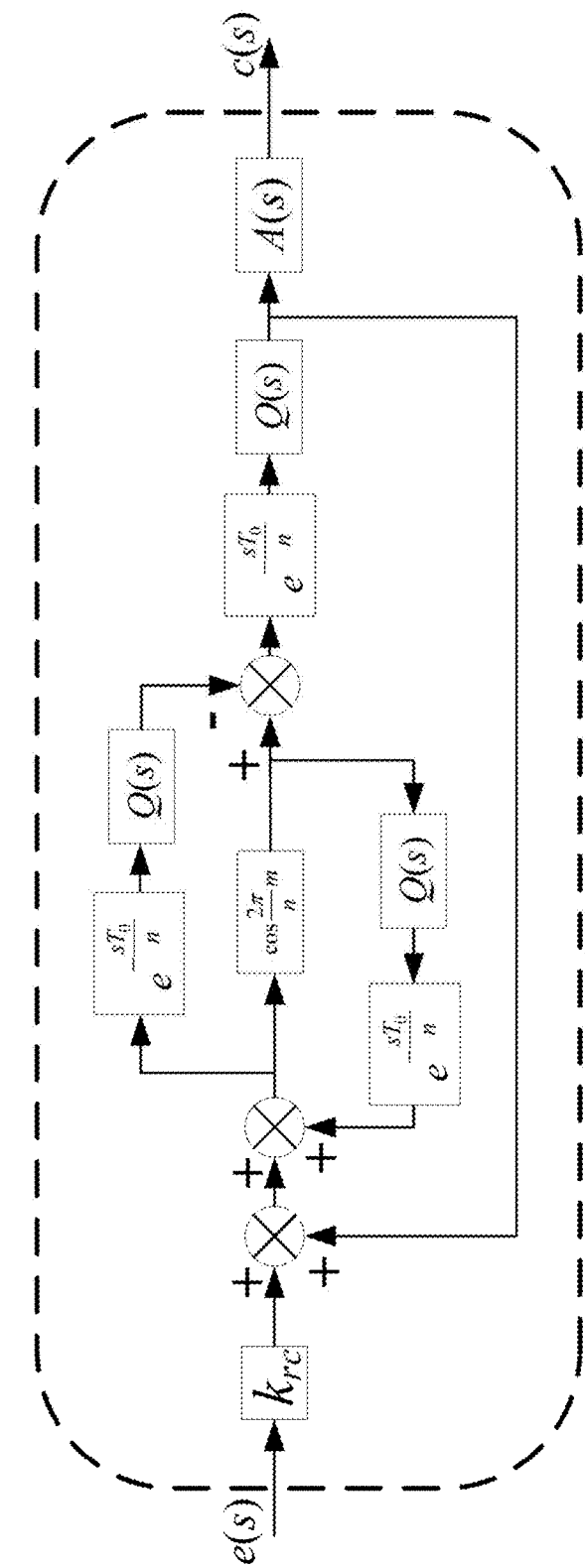
FIG. 4 is a structural block diagram of an improved nk±m RC added with a low pass filter link and a phase lead compensation link on the basis of FIG. 1.
Figure 5:
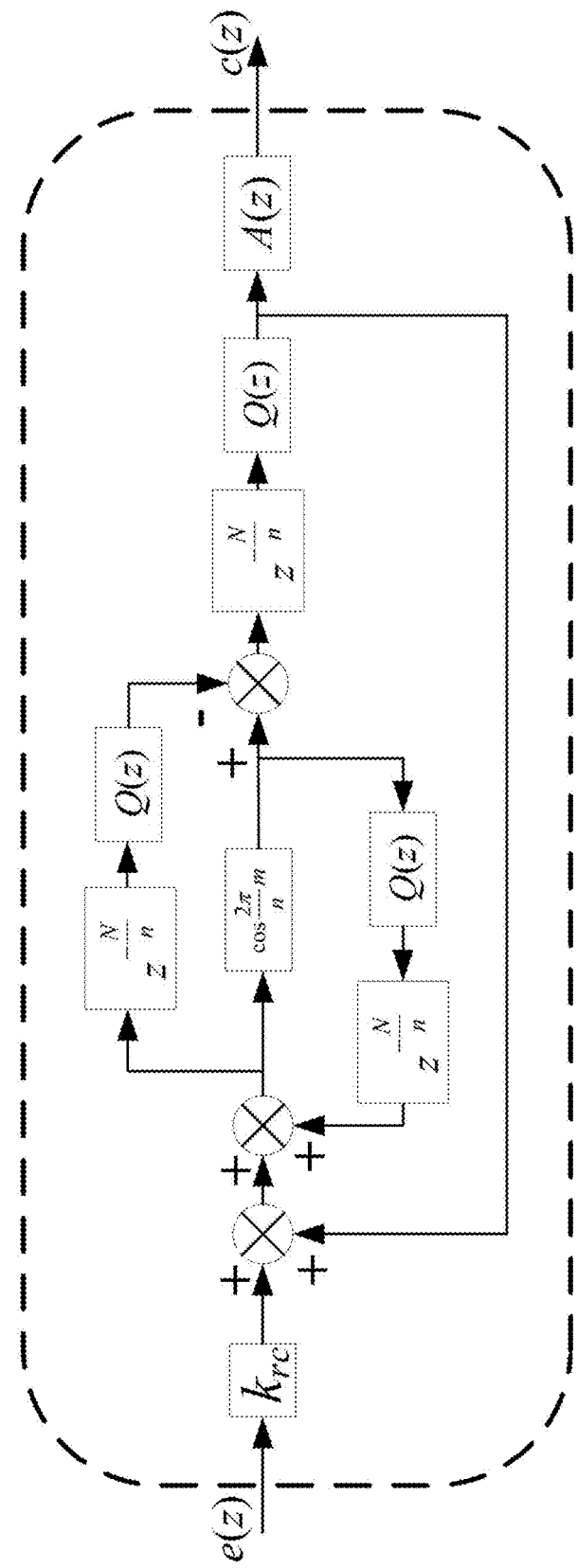
FIG. 5 is a digital implementation form of FIG. 4, and is a structural block diagram of an improved nk±m-order-harmonic digital repetitive controller.

In practical application, in order to improve the stability and anti-interference capability of the control system, it is usually necessary to improve the nk±m RC in FIG. 1 or FIG. 2 by adding a low pass filter link Q(s) or Q(z) and a phase lead compensation link A(s) or A(z) to the repetitive controller, as shown in FIG. 4 and FIG. 5, where FIG. 5 is a digital implementation form of FIG. 4.

The transfer function of the improved nk±m RC shown in FIG. 4 may be written as follows:

$$G_{rc}(s) = \frac{c(s)}{e(s)} = k_{rc} \cdot \frac{\cos\left(\frac{2\pi m}{n}\right)e^{\frac{sT_0}{n}} \cdot Q(s) - Q^2(s)}{e^{\frac{2sT_0}{n}} - 2\cos\left(\frac{2\pi m}{n}\right)e^{\frac{sT_0}{n}} \cdot Q(s) + Q^2(s)} \cdot A(s)$$

The transfer function of the improved nk±m-order-harmonic digital repetitive controller shown in FIG. 5 may be written as follows:

$$G_{rc}(z) = \frac{c(z)}{e(z)} = k_{rc} \cdot \frac{\cos\left(\frac{2\pi m}{n}\right)z^{\frac{2N}{n}} \cdot Q(z) - Q^2(z)}{z^{\frac{2N}{n}} - 2\cos\left(\frac{2\pi m}{n}\right) \cdot z^{\frac{2N}{n}} \cdot Q(z) + Q^2(z)} \cdot A(z)$$

Figure 6:
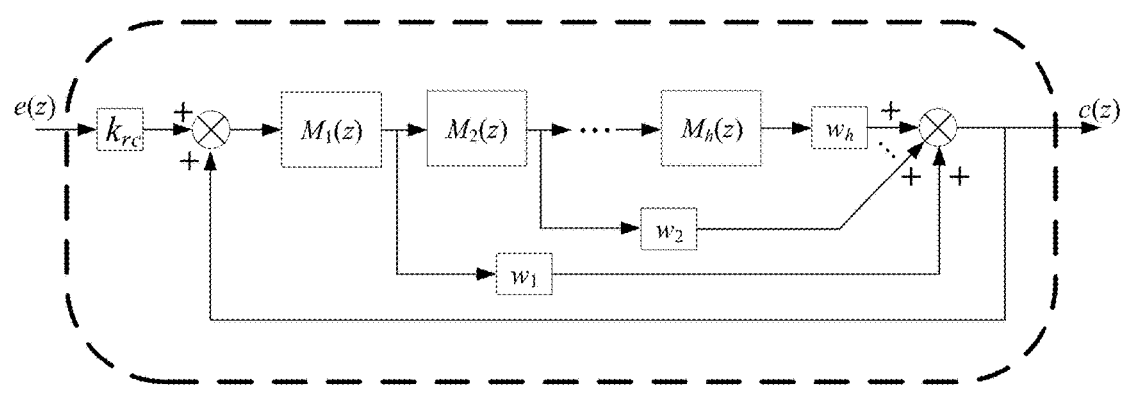
FIG. 6 is a structural block diagram of an h-order nk±m-order-harmonic digital repetitive controller (h≥2) expanded on the basis of FIG. 2.
Figure 7:
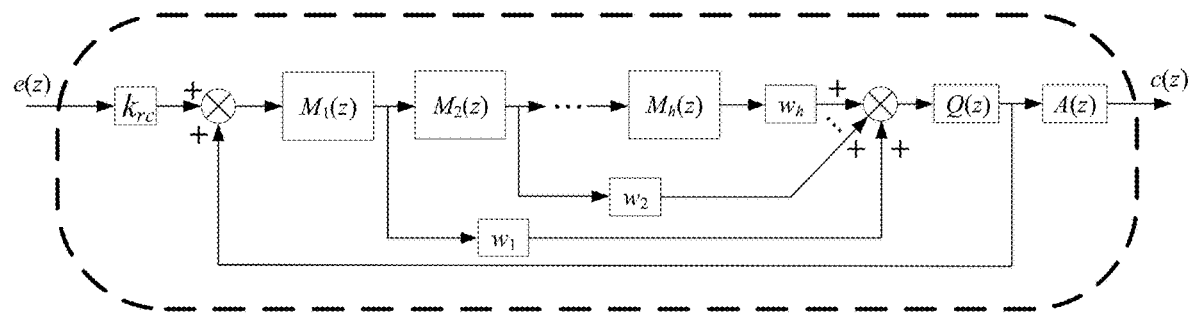
FIG. 7 is a structural block diagram of an improved h-order nk±m-order-harmonic digital repetitive controller (h≥2).
Figure 8:
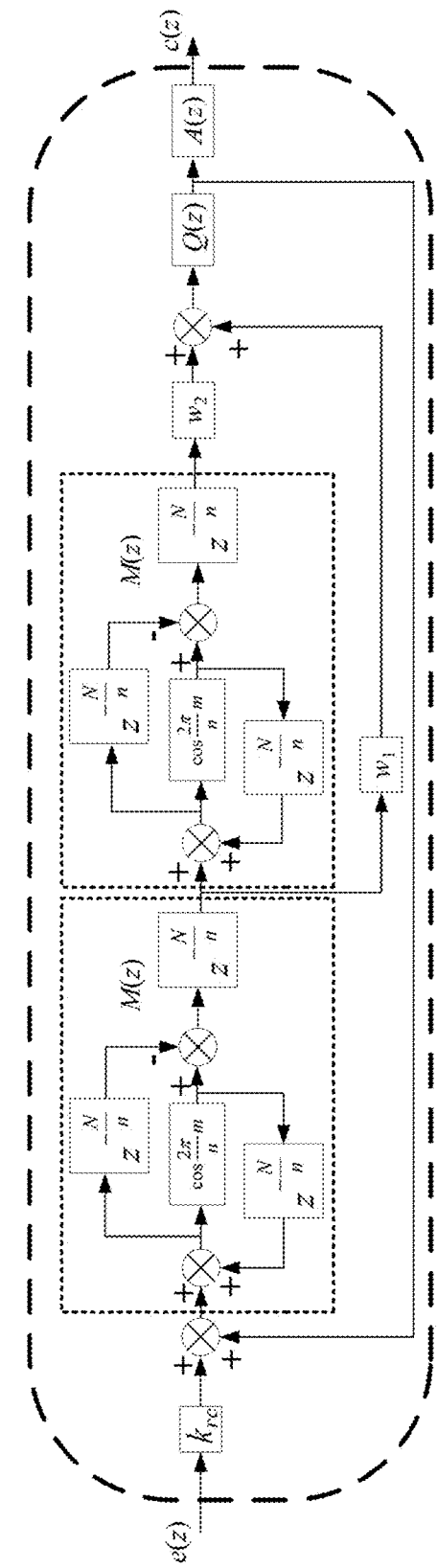
FIG. 8 is a structural block diagram of an improved h-order nk±m-order-harmonic digital repetitive controller when h=2.
Figure 9:
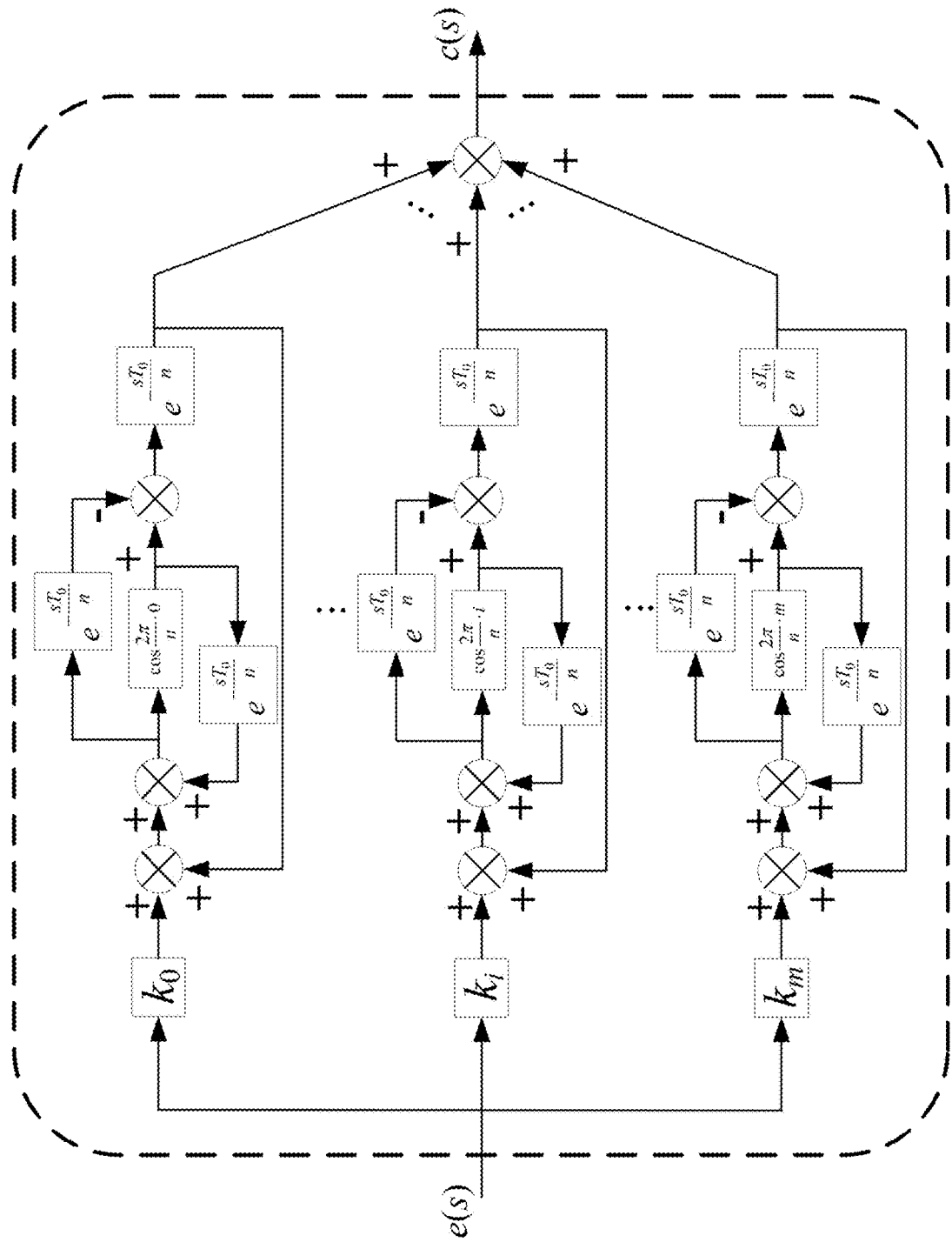
FIG. 9 is a structural block diagram of an all-harmonic repetitive controller with a parallel structure formed by parallel addition of nk±m RC according to the disclosure, where the repetitive controller with this structure may cancel all harmonics.

FIG. 6 shows a universal structural block diagram of an h-order nk±m-order-harmonic digital repetitive controller (h≥2). In practical application, the h-order nk±m RC is also implemented digitally, and the transfer function may be written as follows:

$$G_{hO-rc}(z) = k_{rc} \cdot \frac{\sum_{h=1}^{h} w_h M^h(z)}{1 - \sum_{h=1}^{h} w_h M^h(z)}$$

where $M(z) = \dfrac{z^{-\frac{N}{n}}\left[\cos\left(\frac{2\pi m}{n}\right) - z^{-\frac{N}{n}}\right]}{1 - z^{-\frac{N}{n}}\cos\left(\frac{2\pi m}{n}\right)} = \dfrac{z^{\frac{N}{n}}\cos\left(\frac{2\pi m}{n}\right) - 1}{z^{\frac{N}{n}} - z^{\frac{N}{n}}\cos\left(\frac{2\pi m}{n}\right)}$ FIG. 7 shows an improved h-order nk±m-order-harmonic digital repetitive controller (h≥2). Different from a first-order nk±m-order-harmonic digital repetitive controller, due to the increase of the order, if output ends of the three identical time-delay modules are respectively connected to a low pass filter Q(z) in series for filtering, the complexity of the controller is inevitably greatly increased, and the design difficulty is also increased. Therefore, for the h-order nk±m-order-harmonic digital repetitive controller (h≥2) provided by the disclosure, the low pass filter Q(z) is uniformly connected in series behind $$\sum_{h=1}^{h} w_h M^h(z),$$

and a phase lead compensation module A(z) is still connected in series to the output end of the repetitive controller. The transfer function of the improved h-order nk±m-order-harmonic digital repetitive controller (h≥2) may be written as follows:

$$G_{hO-rc}(z) = k_{rc} \cdot \frac{A(z) \cdot Q(z) \cdot \sum_{h=1}^{h} w_h M^h(z)}{1 - Q(z) \cdot \sum_{h=1}^{h} w_h M^h(z)}$$

where $M(z) = \dfrac{z^{-\frac{N}{n}}\left[\cos\left(\frac{2\pi m}{n}\right) - z^{-\frac{N}{n}}\right]}{1 - z^{-\frac{N}{n}}\cos\left(\frac{2\pi m}{n}\right)} = \dfrac{z^{\frac{N}{n}}\cos\left(\frac{2\pi m}{n}\right) - 1}{z^{\frac{N}{n}} - z^{\frac{N}{n}}\cos\left(\frac{2\pi m}{n}\right)}$ FIG. 8 shows an example of an h-order nk±m-order-harmonic digital repetitive controller when h=2. In order to avoid increasing the complexity and design difficulty of the controller due to the increase of the order, second-order, i.e.

a second-order nk±m-order-harmonic digital repetitive controller is enough. The transfer function is as follows:

$$G_{SO-rc}(z) = k_{rc} \cdot \frac{M(z)[w_1 + w_2 M(z)]}{1 - M(z)[w_1 + w_2 M(z)]}$$

where $M(z) = \dfrac{z^{\frac{N}{n}}\left[\cos\left(\frac{2\pi m}{n}\right) - z^{\frac{N}{n}}\right]}{1 - z^{\frac{N}{n}}\cos\left(\frac{2\pi m}{n}\right)} = \dfrac{z^{\frac{N}{n}}\cos\left(\frac{2\pi m}{n}\right) - 1}{z^{\frac{2N}{n}} - z^{\frac{N}{n}}\cos\left(\frac{2\pi m}{n}\right)}$ FIG. 9 shows an all-harmonic repetitive controller with a parallel structure formed by parallel addition of nk±m RCs according to the disclosure. For different values of n, m and k, the repetitive controller with this structure may cancel all harmonics, and may independently adjust the control gain of each harmonic. The transfer function is as follows:

$$G_{rc}(s) = \frac{c(s)}{e(s)} = \sum_{i=0}^{m} k_i \cdot \frac{\cos\left(\frac{2\pi}{n} \cdot i\right) \cdot e^{\frac{sT_0}{n}} - 1}{e^{\frac{2sT_0}{n}} - 2\cos\left(\frac{2\pi}{n} \cdot i\right) \cdot e^{\frac{sT_0}{n}} + 1}$$

n and m are both positive integers; when n is an even number, m=0, 1, . . . , n/2; and when n is an odd number, m=0, 1, . . . , [n/2].

Figure 10:
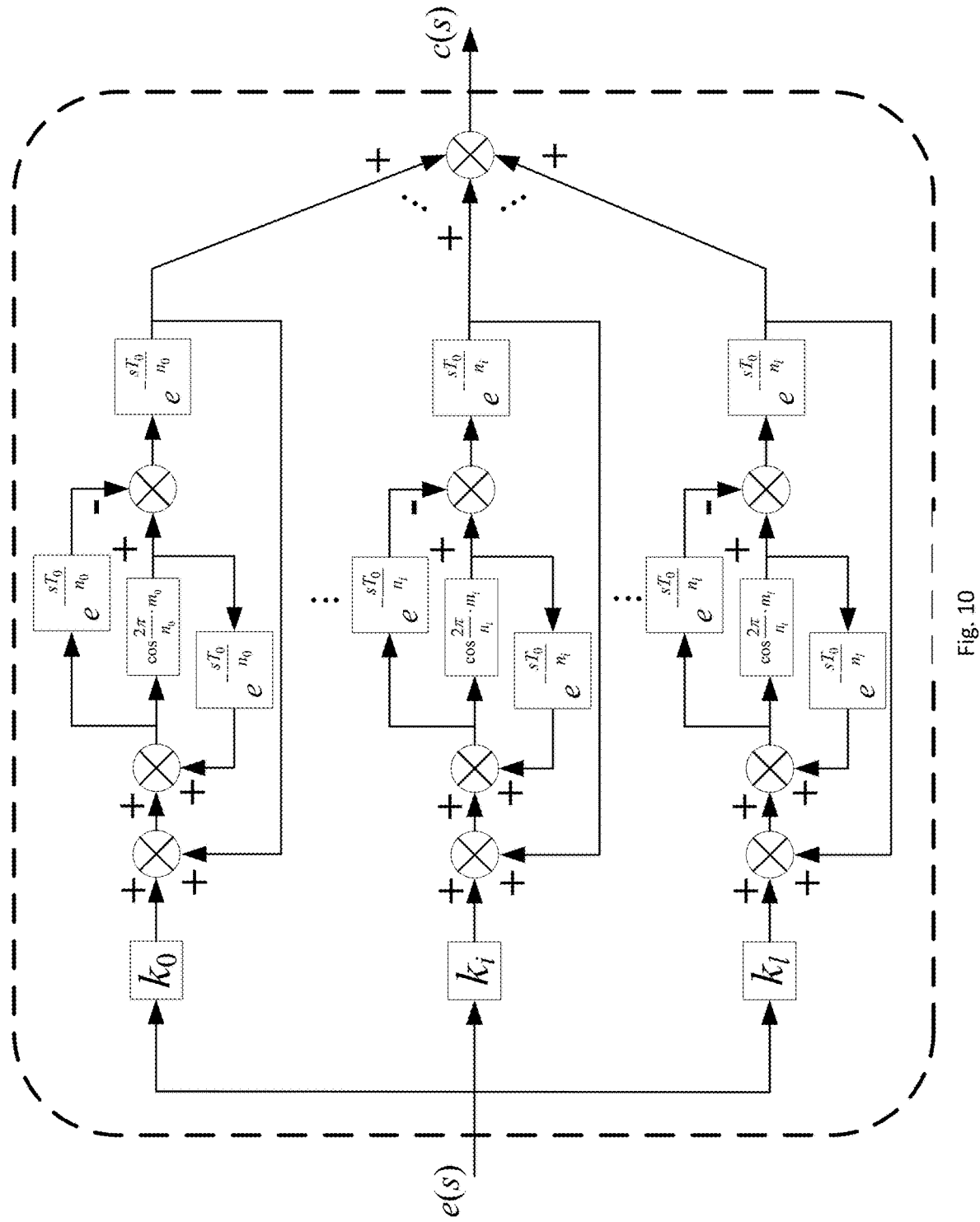
FIG. 10 is a structural block diagram of an any-harmonic repetitive controller with a parallel structure formed by parallel addition of nk±m RC according to the disclosure, where the repetitive controller with this structure may cancel any harmonic.

FIG. 10 shows an any-harmonic repetitive controller with a parallel structure formed by parallel addition of nk±m RCs according to the disclosure. For different values of n, m and k, the repetitive controller with this structure may cancel any harmonic, and may independently adjust the control gain of each harmonic. The transfer function is as follows:

$$G_{rc}(s) = \frac{c(s)}{e(s)} = \sum_{i=0}^{l} k_i \cdot \frac{\cos\left(\frac{2\pi}{n} \cdot i\right) \cdot e^{\frac{sT_0}{n_i}} - 1}{e^{\frac{2sT_0}{n_i}} - 2\cos\left(\frac{2\pi}{n} \cdot i\right) \cdot e^{\frac{sT_0}{n_i}} + 1}$$

$n_i$ and $m_i$ are any positive integers.

Figure 11:
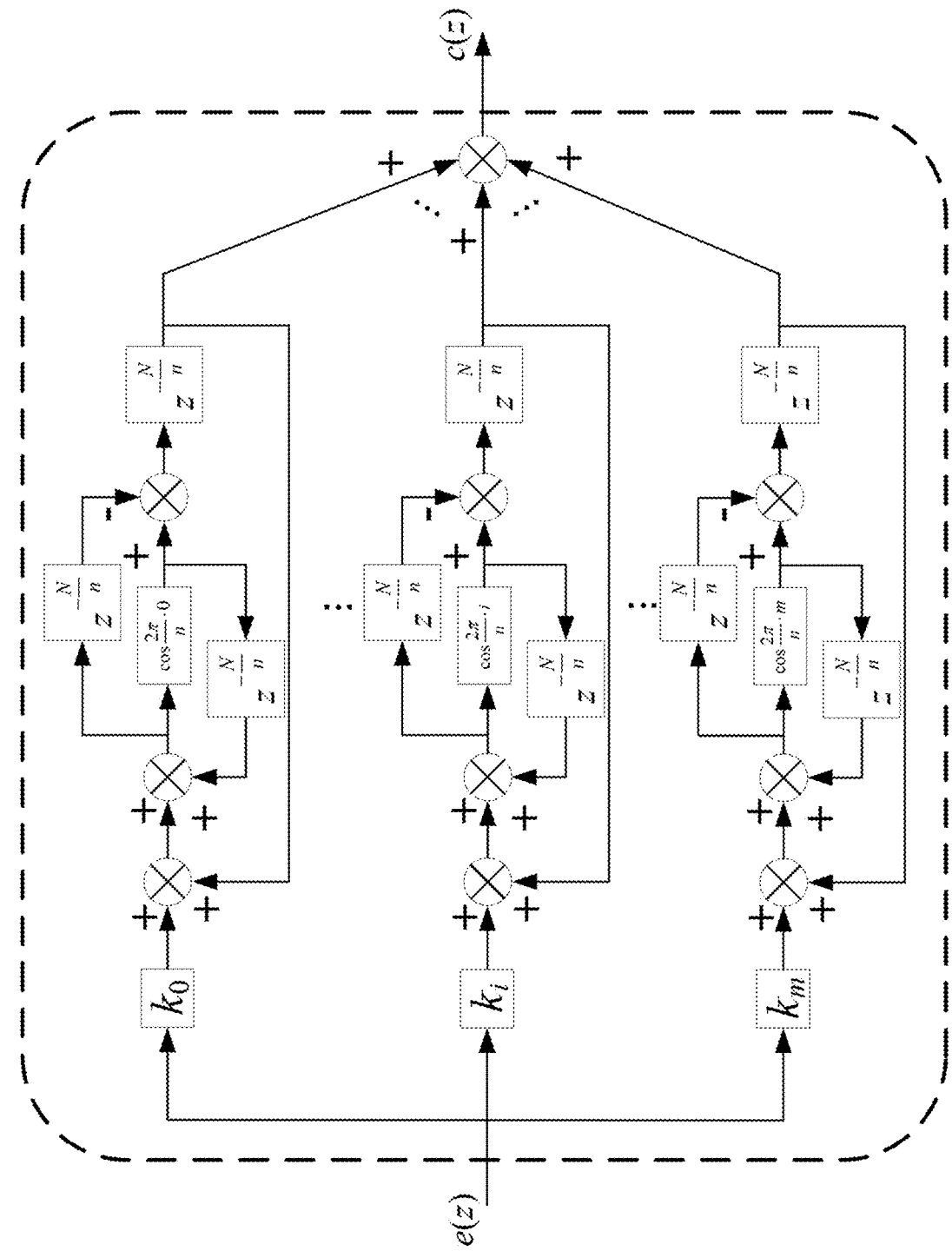
FIG. 11 is a digital implementation form of FIG. 9, and is a structural block diagram of an all-harmonic digital repetitive controller with a parallel structure.

FIG. 11 shows a digital form of an all-harmonic repetitive controller with a parallel structure formed by parallel addition of nk±m RC according to the disclosure. The transfer function is as follows:

$$G_{rc}(z) = \frac{c(z)}{e(z)} = \sum_{i=0}^{m} k_i \cdot \frac{\cos\left(\frac{2\pi}{n} \cdot i\right) \cdot z^{\frac{N}{n}} - 1}{z^{\frac{2N}{n}} - 2\cos\left(\frac{2\pi}{n} \cdot i\right) \cdot z^{\frac{N}{n}} + 1}$$

n and m are both positive integers; when n is an even number, m=0, 1, . . . , n/2; and when n is an odd number, m=0, 1, . . . , [n/2].

Figure 12:
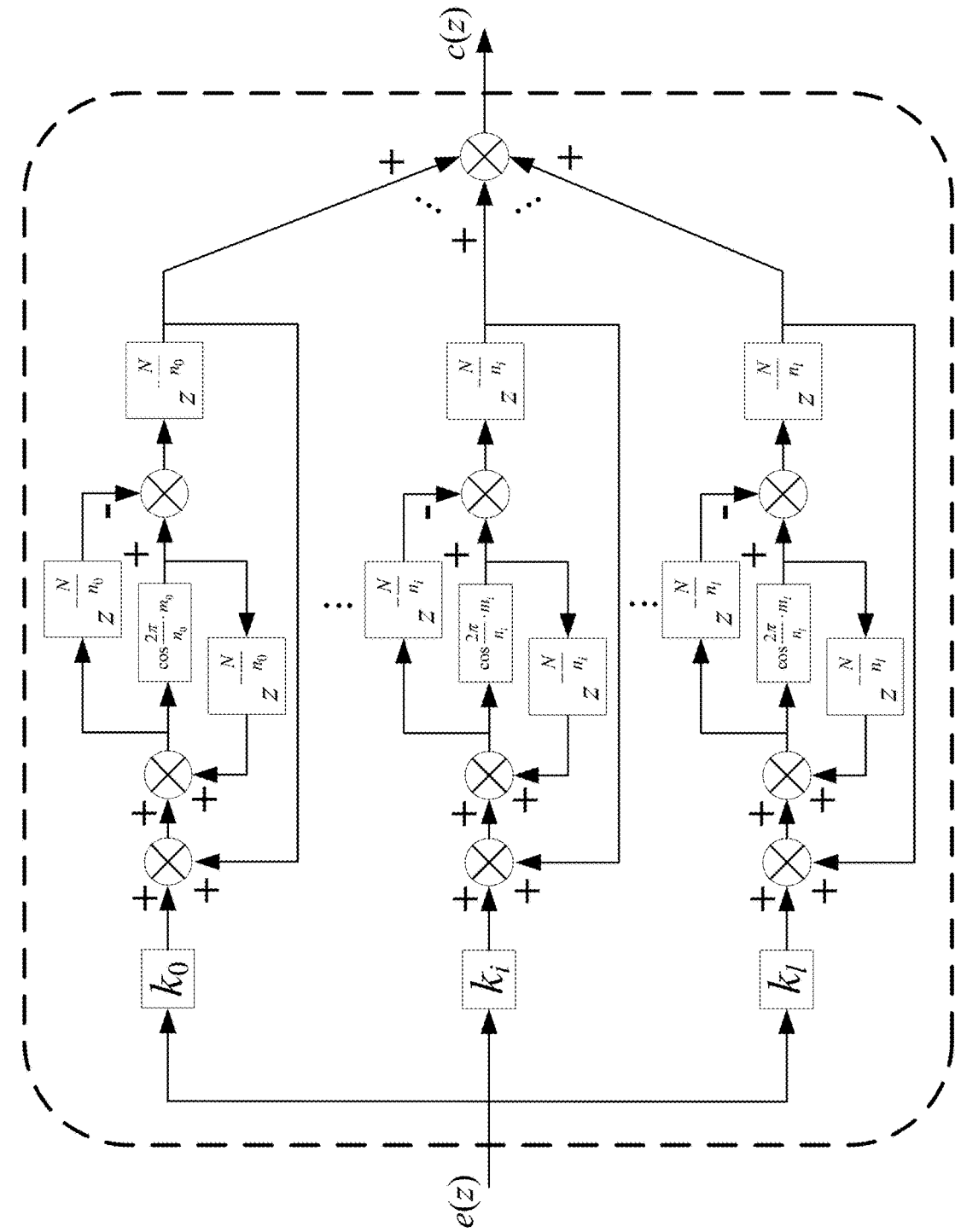
FIG. 12 is a digital implementation form of FIG. 10, and is a structural block diagram of an any-harmonic digital repetitive controller with a parallel structure.

FIG. 12 shows a digital form of an any-harmonic repetitive controller with a parallel structure formed by parallel addition of nk±m RC according to the disclosure. The transfer function is as follows:

$$G_{rc}(s) = \frac{c(s)}{e(s)} = \sum_{i=0}^{l} k_i \cdot \frac{\cos\left(\frac{2\pi}{n_i} \cdot m_i\right) \cdot z^{\frac{N}{n_i}} - 1}{z^{\frac{2N}{n_i}} - 2\cos\left(\frac{2\pi}{n_i} \cdot m_i\right) \cdot z^{\frac{N}{n_i}} + 1}$$

$n_i$ and $m_i$ are any positive integers.

Figure 13:
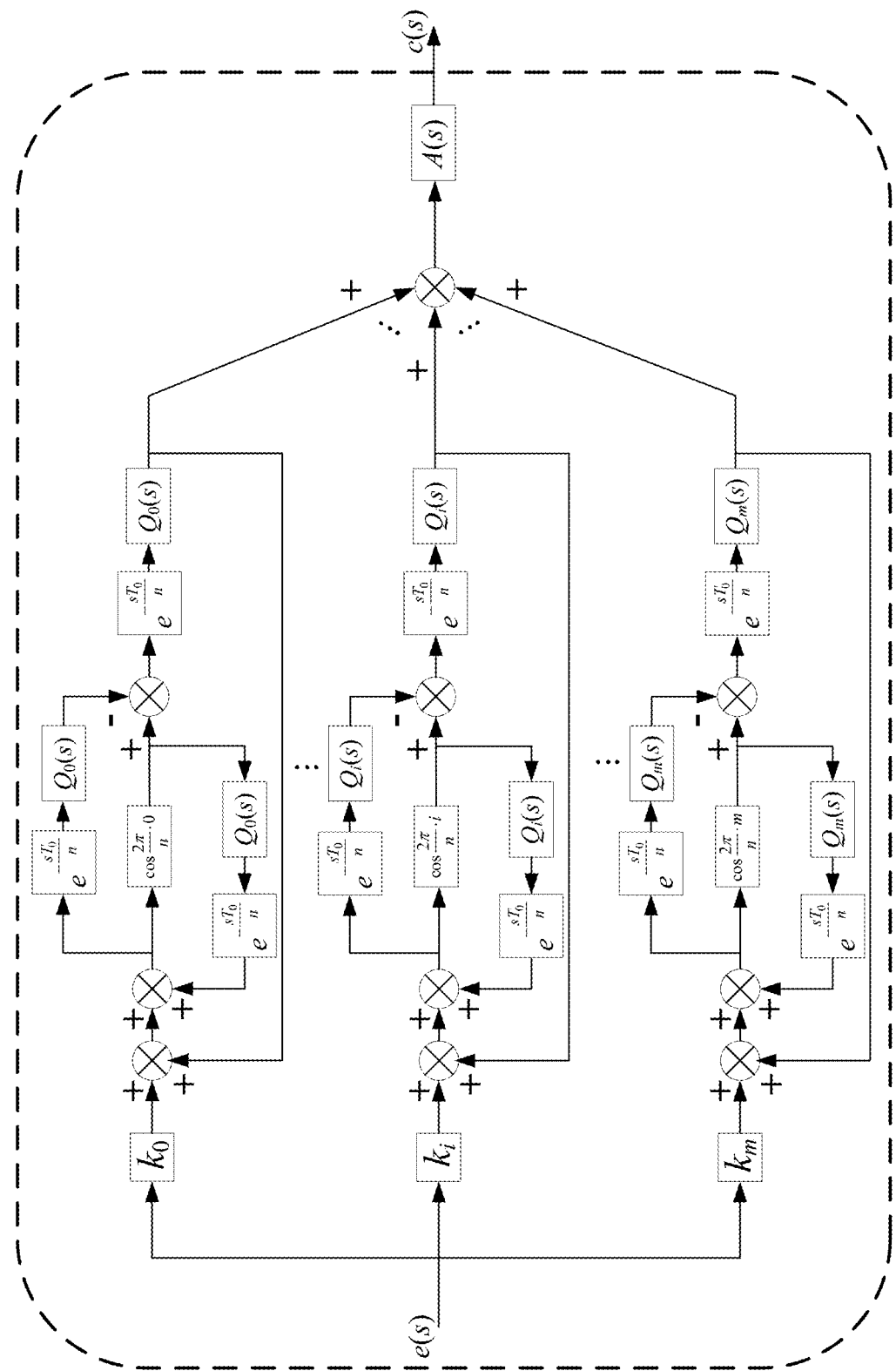
FIG. 13 is a structural block diagram of an improved all-harmonic repetitive controller with a parallel structure added with a low pass filter link and a phase lead compensation link on the basis of FIG. 9.

FIG. 13 shows a structural block diagram of an improved all-harmonic repetitive controller with a parallel structure added with a low pass filter link Q(s) and a phase lead compensation link A(s). The transfer function is as follows:

$$G_{rc}(s) = \frac{c(s)}{e(s)} = \sum_{i=0}^{l} k_i \cdot \frac{\cos\left(\frac{2\pi}{n_i} \cdot m_i\right) \cdot e^{\frac{sT_0}{n_i}} \cdot Q_i(s) - Q_i^2(s)}{e^{\frac{2sT_0}{n_i}} - 2\cos\left(\frac{2\pi}{n_i} \cdot m_i\right) \cdot e^{\frac{sT_0}{n_i}} \cdot Q_i(s) - Q_i^2(s)} \cdot A(s)$$

n and m are both positive integers; when n is an even number, m=0, 1, . . . , n/2; and when n is an odd number, m=0, 1, . . . , [n/2].

Figure 14:
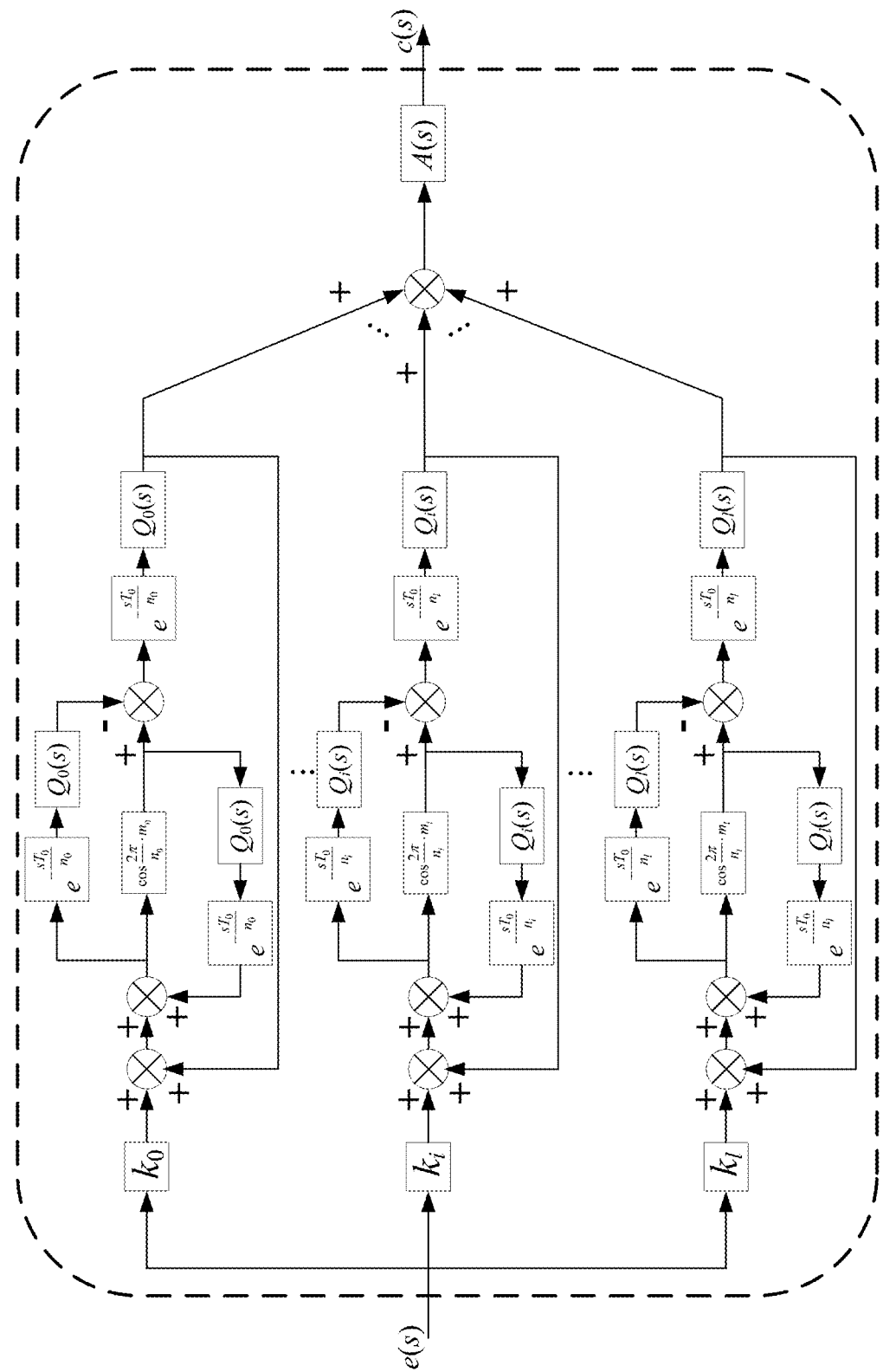
FIG. 14 is a structural block diagram of an improved any-harmonic repetitive controller with a parallel structure added with a low pass filter link and a phase lead compensation link on the basis of FIG. 10.

FIG. 14 shows a structural block diagram of an improved any-harmonic repetitive controller with a parallel structure added with a low pass filter link Q(s) and a phase lead compensation link A(s). The transfer function is as follows:

$$G_{rc}(s) = \frac{c(s)}{e(s)} = \sum_{i=0}^{m} k_i \cdot \frac{\cos\left(\frac{2\pi}{n} \cdot i\right) \cdot e^{\frac{sT_0}{n}} \cdot Q_i(s) - Q_i^2(s)}{e^{\frac{2sT_0}{n}} - 2\cos\left(\frac{2\pi}{n} \cdot i\right) \cdot e^{\frac{sT_0}{n}} \cdot Q_i(s) - Q_i^2(s)} \cdot A(s)$$

$n_i$ and $m_i$ are any positive integers.

Figure 15:
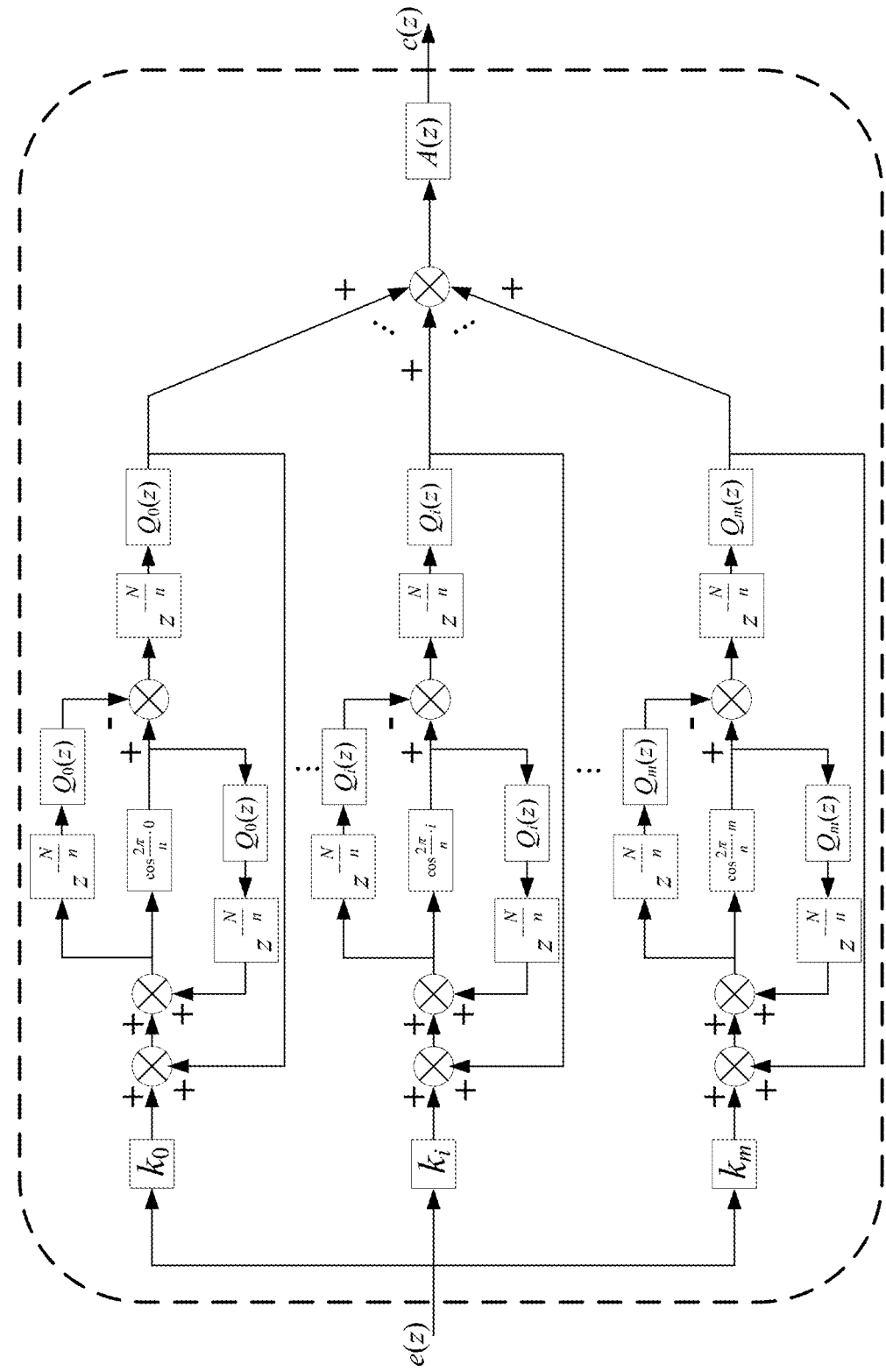
FIG. 15 is a digital implementation form of FIG. 13, and is a structural block diagram of an improved all-harmonic digital repetitive controller with a parallel structure.

FIG. 15 shows a structural block diagram of an improved all-harmonic digital repetitive controller with a parallel structure. The transfer function is as follows:

$$G_{rc}(z) = \frac{c(z)}{e(z)} = \sum_{i=0}^{m} k_i \cdot \frac{\cos\left(\frac{2\pi}{n} \cdot i\right) \cdot z^{\frac{N}{n}} \cdot Q_i(z) - Q_i^2(z)}{z^{\frac{2N}{n}} - 2\cos\left(\frac{2\pi}{n} \cdot i\right) \cdot z^{\frac{N}{n}} \cdot Q_i(z) - Q_i^2(z)} \cdot A(z)$$

n and m are both positive integers; when n is an even number, m=0, 1, . . . , n/2; and when n is an odd number, m=0, 1, . . . , [n/2].

Figure 16:
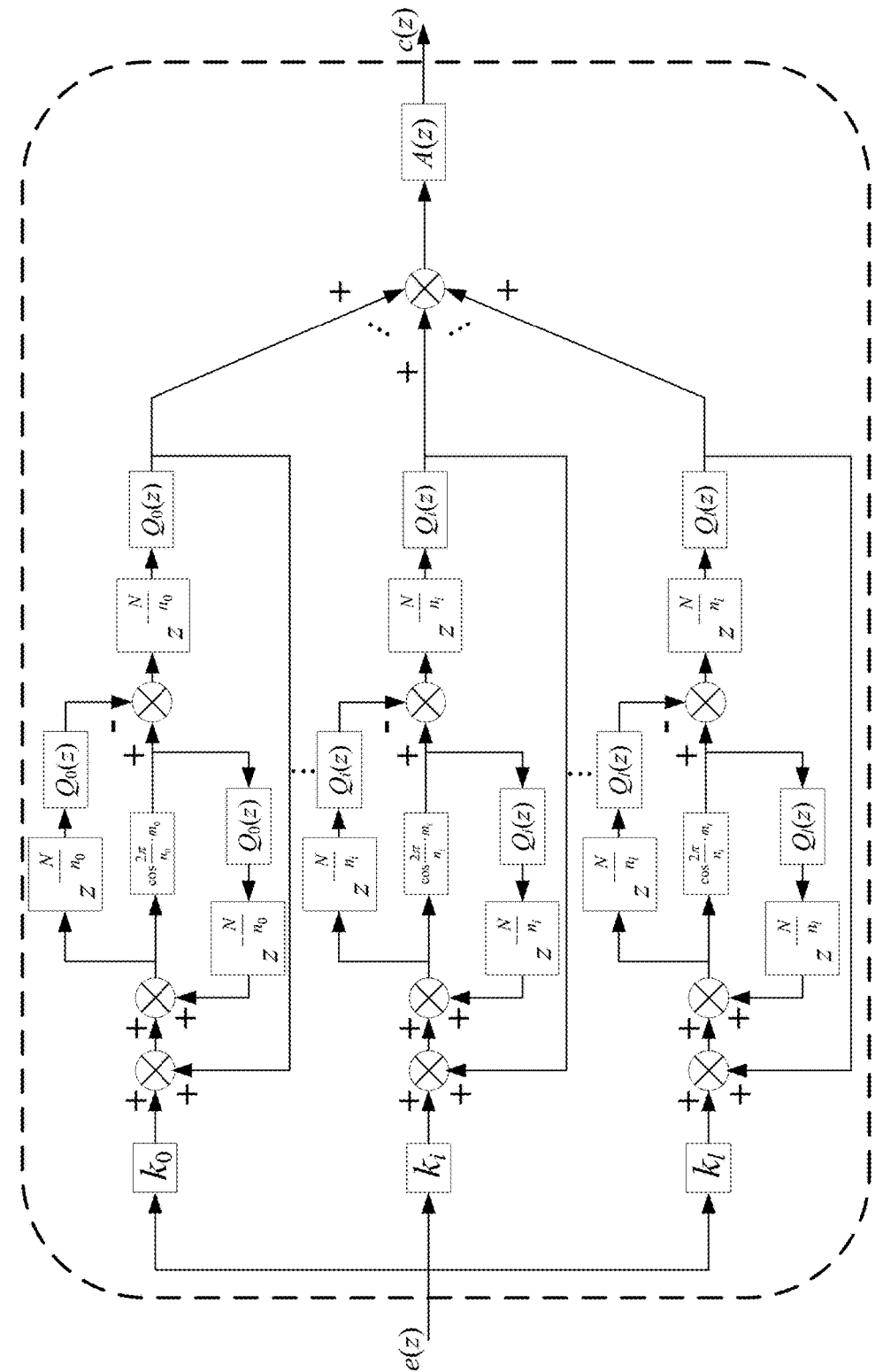
FIG. 16 is a digital implementation form of FIG. 14, and is a structural block diagram of an improved any-harmonic digital repetitive controller with a parallel structure.

FIG. 16 shows a structural block diagram of an improved any-harmonic digital repetitive controller with a parallel structure. The transfer function is as follows:

$$G_{rc}(z) = \frac{c(z)}{e(z)} = \sum_{i=0}^{l} k_i \cdot \frac{\cos\left(\frac{2\pi}{n_1} \cdot m_i\right) \cdot z^{\frac{N}{n_i}} \cdot Q_i(z) - Q_i^2(z)}{z^{\frac{2N}{n_i}} - 2\cos\left(\frac{2\pi}{n_1} \cdot m_i\right) \cdot z^{\frac{N}{n_i}} \cdot Q_i(z) - Q_i^2(z)} \cdot A(z)$$

$n_i$ and $m_i$ are any positive integers.

Example 2

The nk±m RC provided in Example 1 and the h-order nk±m-order-harmonic digital repetitive controller obtained by further expansion may be added to a general feedback control system in an insertion or cascade manner for canceling nk±m-order-harmonic components in control errors. The addition of the nk±m RC and the h-order nk±m-order-harmonic digital repetitive controller obtained by further expansion to the general feedback system in the insertion manner will be introduced below respectively:

(1) For nk±m RC

Figure 17:
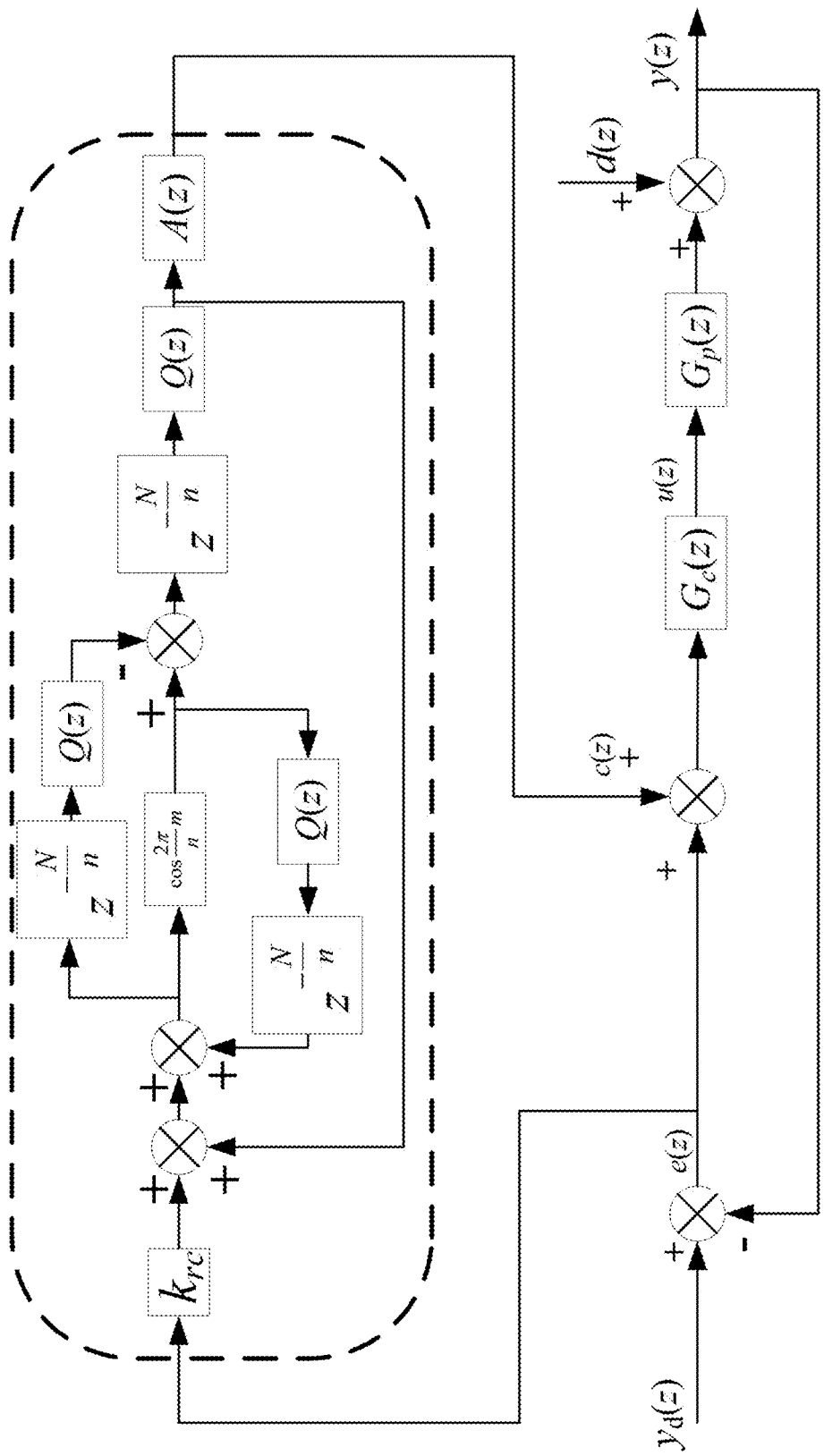
FIG. 17 is a structural block diagram of a control system in which an improved nk±m-order-harmonic digital repetitive controller superposed with a general feedback controller.

A specific embodiment of the nk±m RC provided by the disclosure is introduced by taking the addition of the nk±m- order-harmonic digital repetitive controller to the general feedback system in the insertion manner as an example in this example:

FIG. 17 shows a structural block diagram of adding an improved nk±m-order-harmonic digital repetitive controller to a general feedback control system. $G_{rc}(z)$ is the improved nk±m-order-harmonic digital repetitive controller; $G_c(z)$ is a conventional feedback controller; $G_p(z)$ is a control object; $y_d(z)$ is the reference input of the system and typically is the fundamental reference signal; y(z) is the actual output of the system; e(z) is the error of reference and actual signals and is also the input signal of the repetitive controller $G_{rc}(z)$; c(z) is the output signal of the repetitive controller $G_{rc}(z)$ and is also added with the error signal e(z) to serve as the input of the conventional feedback controller $G_c(z)$; u(z) is the output signal of the conventional feedback controller $G_c(z)$ and is also the input signal of the control object $G_p(z)$; and d(z) is the disturbance input signal of the system, which is added to the output signal of the control object $G_p(z)$ to form the actual output signal y(z).

Figure 18:
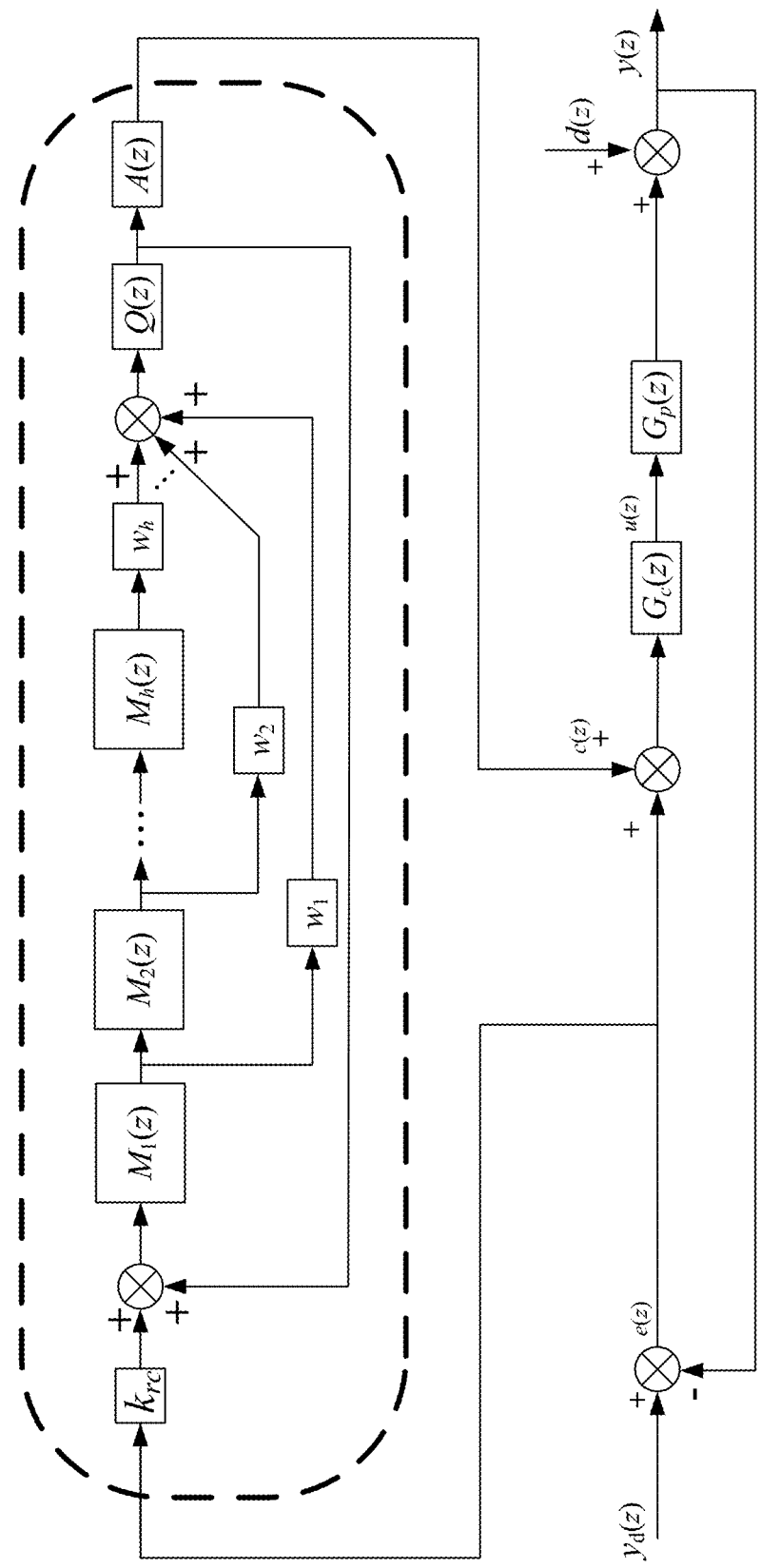
FIG. 18 is a structural block diagram of a control system in which an improved h-order nk±m-order-harmonic digital repetitive controller (h≥2) superposed with a general feedback controller.

FIG. 18 shows a structural block diagram of adding an improved h-order nk±m-order-harmonic digital repetitive controller (h≥2) to a general feedback control system. A high-order nk±m-order-harmonic digital repetitive controller is also added to the general feedback control system in the insertion manner.

Figure 19A:
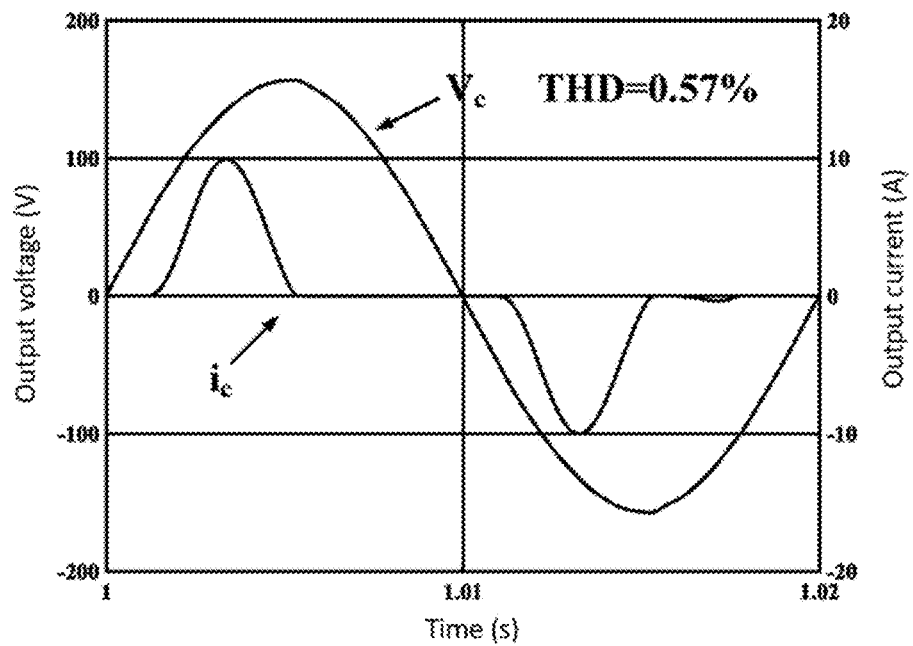
FIG. 19A is a steady-state output oscillogram under two complex controls in application of an nk±m RC (n=1 and m=0) according to the disclosure in combination with a general feedback controller.
Figure 19B:
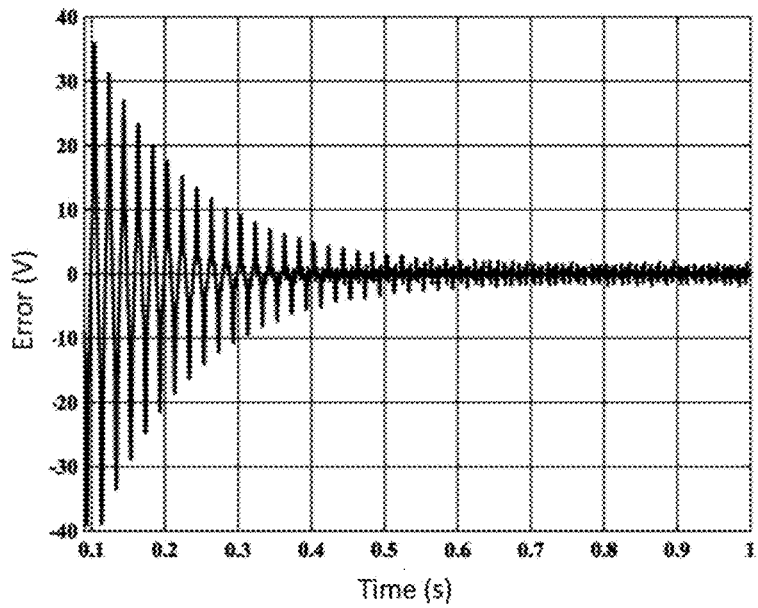
FIG. 19B is an error convergence variation diagram under two complex controls in application of an nk±m RC (n=1 and m=0) according to the disclosure in combination with a general feedback controller.
Figure 19C:
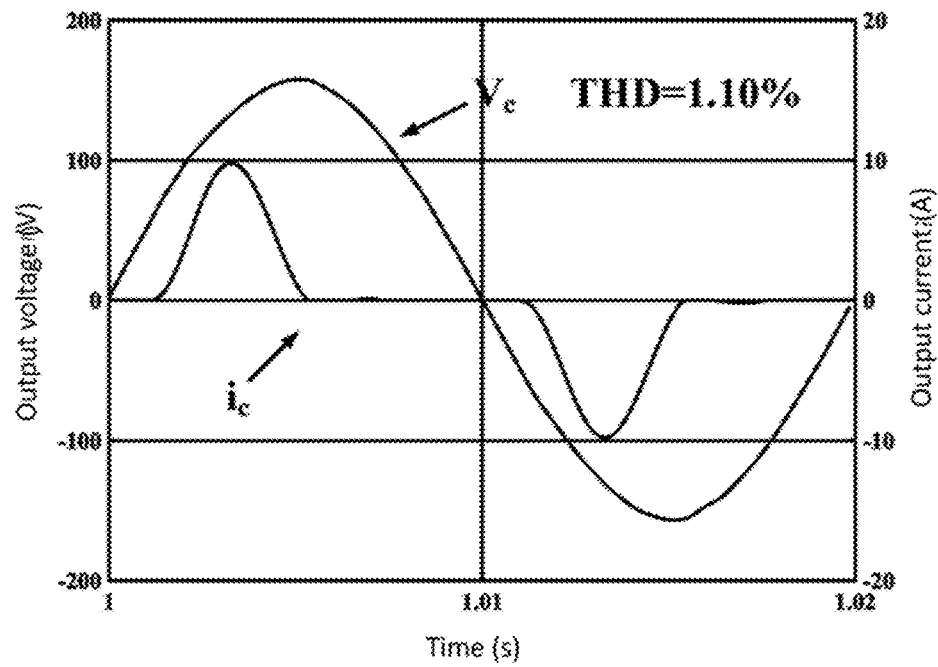
FIG. 19C is a steady-state output oscillogram under two complex controls in application of an nk±m RC (n=4 and m=1) according to the disclosure in combination with a general feedback controller.
Figure 19D:
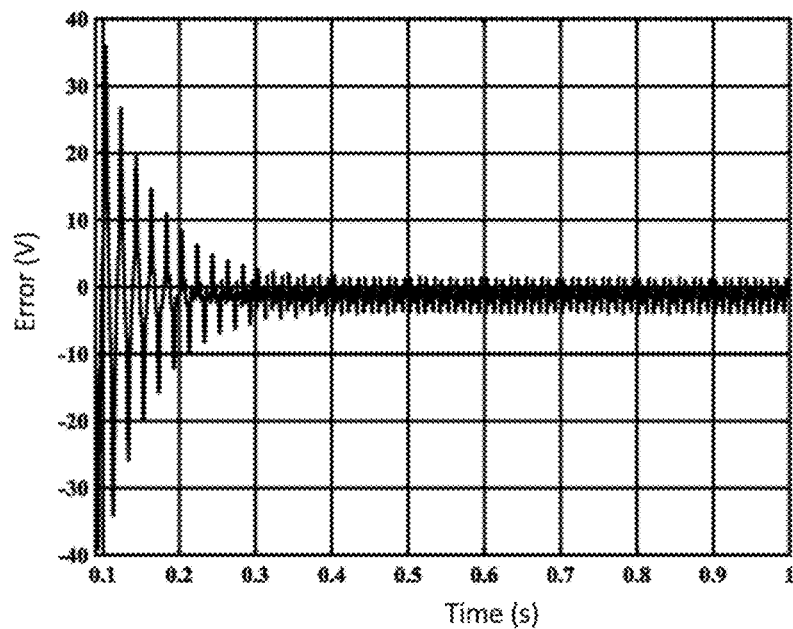
FIG. 19D is an error convergence variation diagram under two complex controls in application of an nk±m RC (n=4 and m=1) according to the disclosure in combination with a general feedback controller.

In order to verify the effectiveness and practicability of the nk±m RC provided by the disclosure, a simulation experiment based on Matlab/Simulink is carried out as follows:

In the case of a single-phase inverter with single-phase rectifier loads, since harmonics are mainly concentrated at (4k±1) (i.e. odd orders of 3, 5, 7, 9 and the like)-frequency components and it is often necessary to track a fundamental reference signal, it only needs to make n=4 and m=1, and error-free tracking of the fundamental reference signal and complete cancellation of odd-harmonics may be realized. A control target is to make the output voltage track the reference voltage accurately, where the reference voltage is $V_{ref}$=156 sin 100πt. FIG. 19A-FIG. 19D show steady-state output oscillograms and error convergence variation diagrams under two complex controls of a conventional repetitive controller (CRC) (Zhou K, Wang D, "Digital repetitive learning controller for three-phase CVCF PWM inverter[J]", IEEE Transactions on Industrial Electronics, 2001) and a 4k±1 RC provided by the disclosure which are added respectively when t=0.1 s and the repetitive control gain $k_{rc}$ is the same on the basis of an FC (state feedback controller). FIG. 19A and FIG. 19B correspond to the CRC; FIG. 19A is the steady-state output oscillogram, and FIG. 19B is the error convergence variation diagram. FIG. 19C and FIG. 19D correspond to the 4k±1 RC provided by the disclosure; FIG. 19C is the steady-state output oscillogram, and FIG. 19D is the error convergence variation diagram.

According to FIG. 19A-FIG. 19D, it can be seen that the total harmonic distortions (THD) of the CRC and the 4k±1 RC are 0.57% and 1.1%, respectively, which may reach very small values, but with almost the same harmonic suppression effect as the CRC, the CRC needs about 0.7 s to reach a steady state. However, the 4k±1 RC corresponding to the disclosure only needs about 0.35 s to reach a steady state, and therefore the error convergence speed of the 4k±1 RC is about twice that of the CRC, i.e. the error convergence speed of the 4k±1 RC corresponding to the disclosure is obviously higher.

Figure 20A:
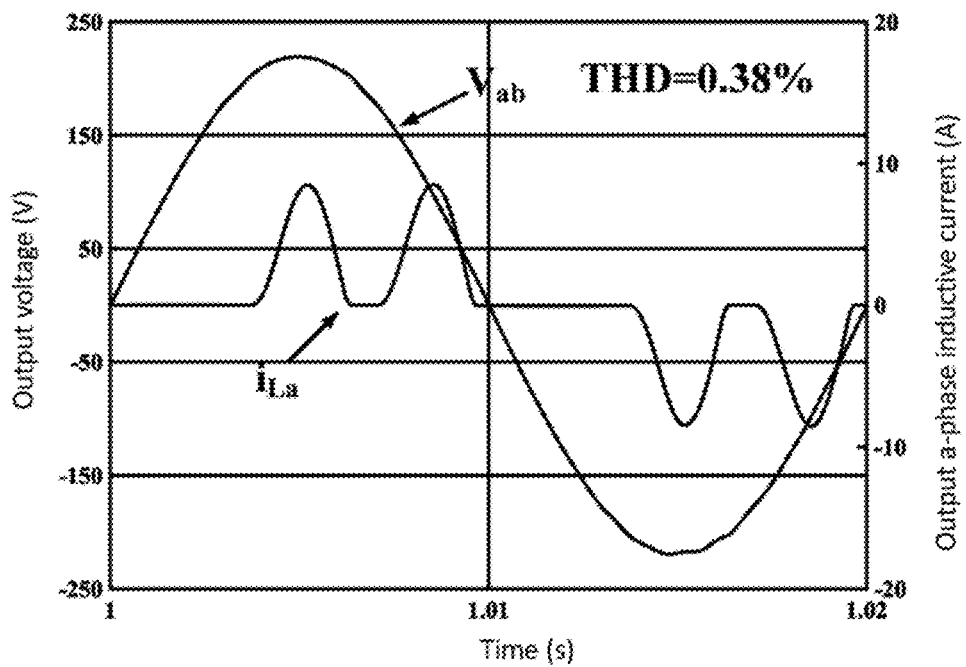
FIG. 20A is a steady-state output oscillogram under two complex controls in application of an nk±m RC (n=1 and m=0) according to the disclosure in combination with a general feedback controller.
Figure 20B:
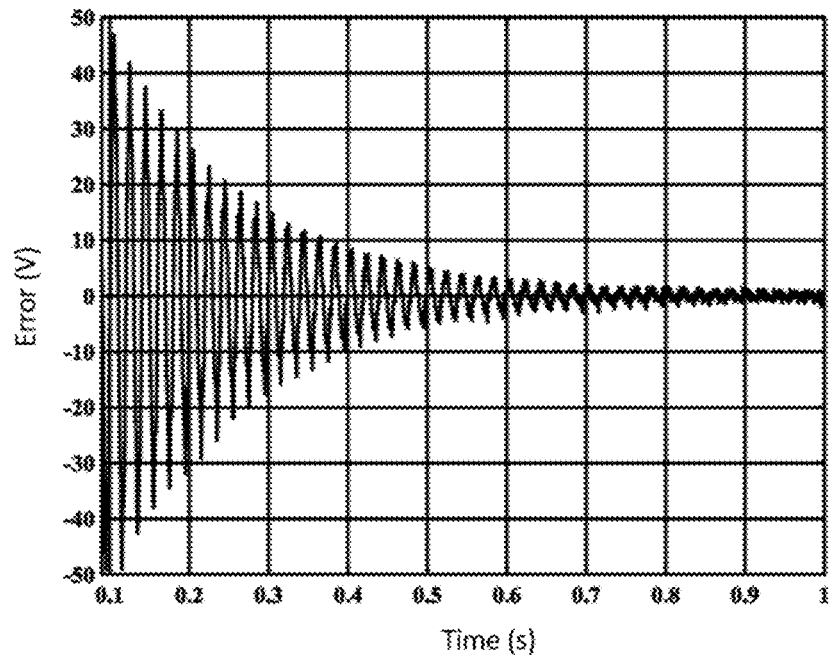
FIG. 20B is an error convergence variation diagram under two complex controls in application of an nk±m RC (n=1 and m=0) according to the disclosure in combination with a general feedback controller.
Figure 20C:
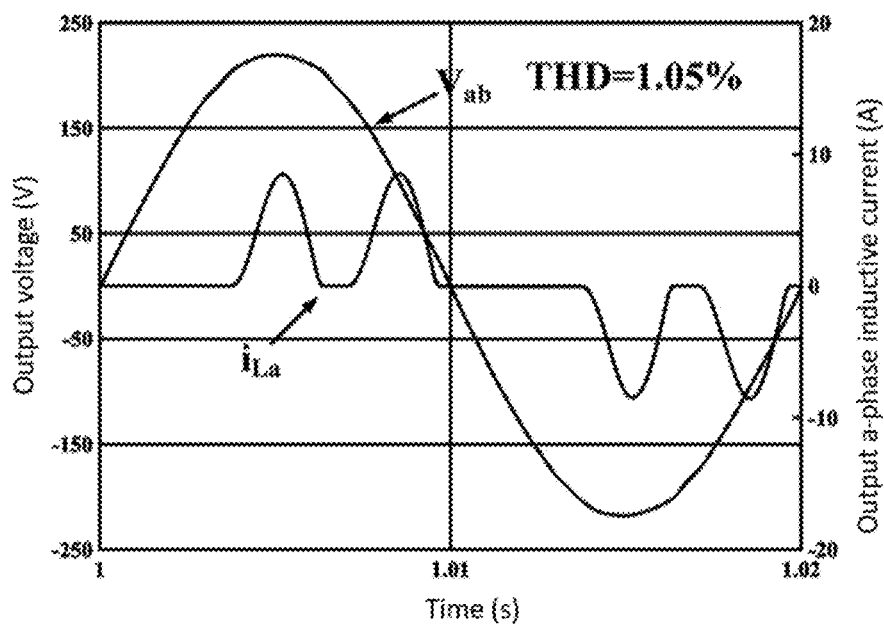
FIG. 20C is a steady-state output oscillogram under two complex controls in application of an nk±m RC (n=6 and m=1) according to the disclosure in combination with a general feedback controller.
Figure 20D:
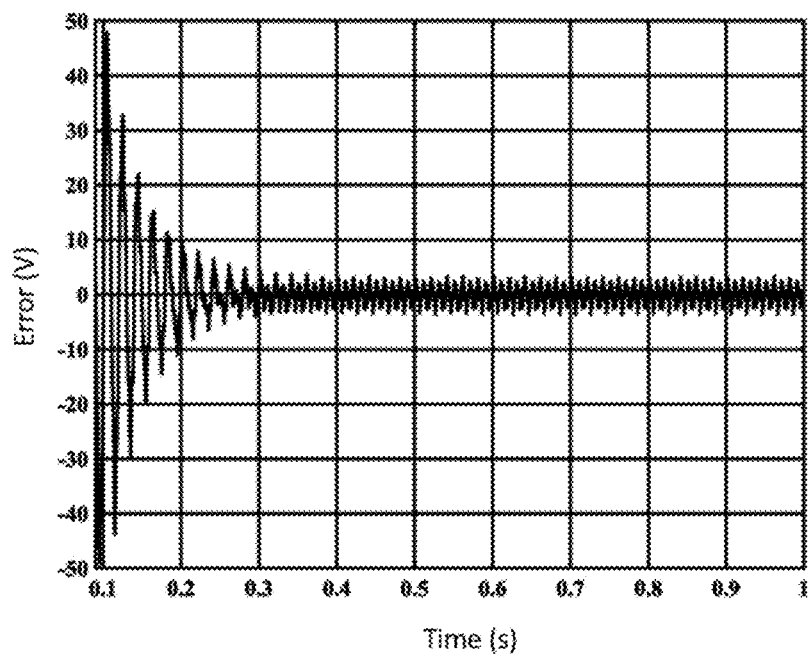
FIG. 20D is an error convergence variation diagram under two complex controls in application of an nk±m RC (n=6 and m=1) according to the disclosure in combination with a general feedback controller.

In the case of a three-phase inverter with three-phase rectifier loads, since harmonics are mainly concentrated at (6k±1) (i.e. orders of 5, 7, 11, 13 and the like)-order-harmonic frequency components and it is often necessary to track a fundamental reference signal, it only needs to make n=6 and m=1, and error-free tracking of the fundamental reference signal and complete cancellation of (6k±1)-order-harmonics may be realized. A control target is to make the output voltage track the reference voltage accurately, where the reference voltages are $V_{abref}$=220 sin 100πt, $V_{bcref}$=220 sin(100πt−⅔π), and $V_{caref}$=220 sin(100πt+⅔π). FIG. 20A-FIG. 20D show steady-state output oscillograms and error convergence variation diagrams under two complex controls of a CRC and a 6k±1 RC provided by the disclosure which are added respectively when t=0.1 s and the repetitive control gain $k_{rc}$ is the same on the basis of an FC (state feedback controller). FIG. 20A and FIG. 20B correspond to the CRC; FIG. 20A is the steady-state output oscillogram, and FIG. 20B is the error convergence variation diagram. FIG. 20C and FIG. 20D correspond to the 6k±1 RC provided by the disclosure; FIG. 20C is the steady-state output oscillogram, and FIG. 20D is the error convergence variation diagram.

According to FIG. 20A-FIG. 20D, it can be seen that the total harmonic distortions (THD) of the CRC and the 6k±1 RC are 0.38% and 1.05%, respectively, which may reach very small values, but with almost the same harmonic suppression effect as the CRC, the CRC needs about 0.75 s to reach a steady state. However, the 6k±1 RC corresponding to the disclosure only needs about 0.25 s to reach a steady state, and therefore the error convergence speed of the 6k±1 RC is about triple that of the CRC, i.e. the error convergence speed of the 6k±1 RC corresponding to the disclosure is obviously higher.

(2) For h-Order Nk±m RC

The nk±m RC provided by the disclosure may be further expanded into an h-order nk±m-order-harmonic digital repetitive controller (h≥2). Here, a 6k±1 RC and a second-order 6k±1 RC are taken as examples. Specific simulation examples verify that compared with a first-order nk±m-order-harmonic digital repetitive controller, the performance of the high-order nk±m-order-harmonic digital repetitive controller is improved, the mismatch between a controller internal model and a periodic signal to be tracked or canceled near a resonance frequency point may be suppressed to some extent, and the error convergence speed is higher.

Figure 21A:
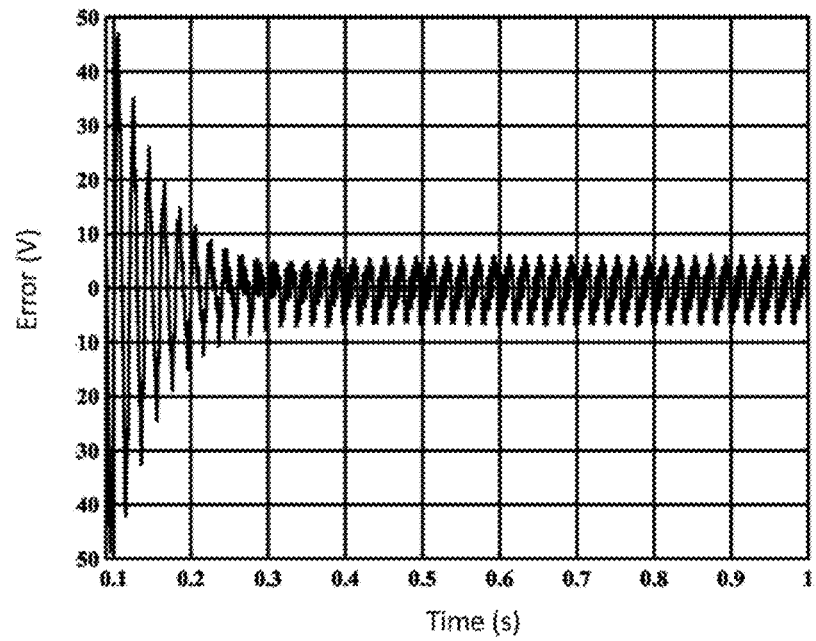
FIG. 21A is an error convergence variation diagram of a controller when the reference voltage frequency is changed from 50 Hz to 49.8 Hz, i.e. an internal model of the controller is mismatched with a periodic signal to be tracked or canceled, taking 6k±1 RC as an example.
Figure 21B:
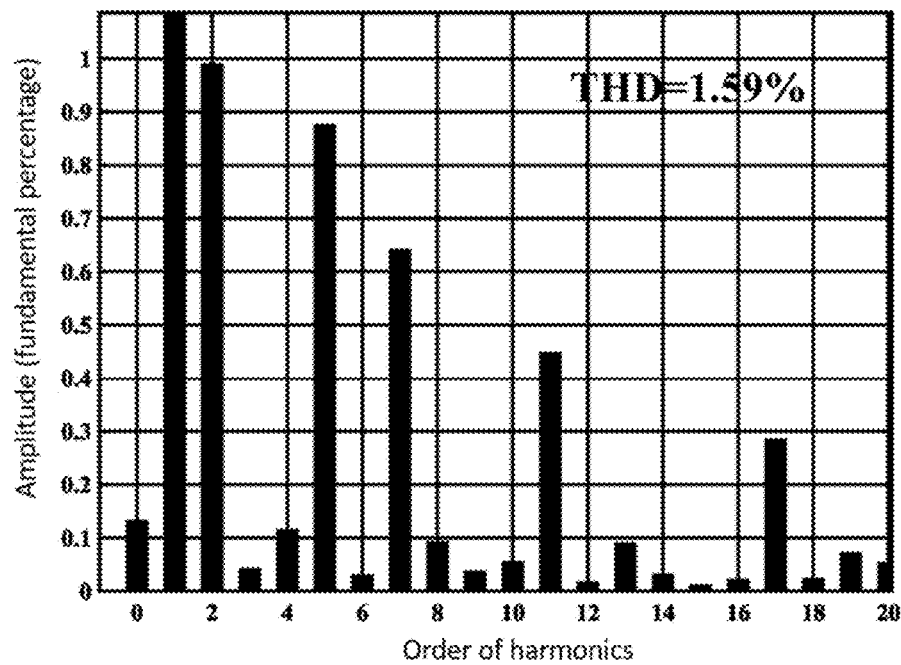
FIG. 21B is a harmonic spectrogram of a controller when the reference voltage frequency is changed from 50 Hz to 49.8 Hz, i.e. an internal model of the controller is mismatched with a periodic signal to be tracked or canceled, taking 6k±1 RC as an example.
Figure 21C:
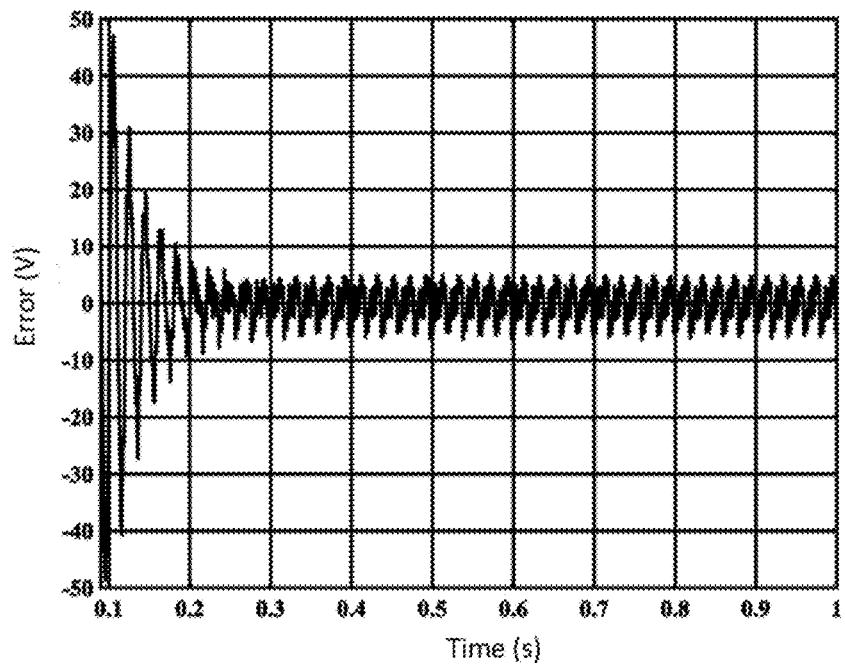
FIG. 21C is an error convergence variation diagram of a controller when the reference voltage frequency is changed from 50 Hz to 49.8 Hz, i.e. an internal model of the controller is mismatched with a periodic signal to be tracked or canceled, taking second-order 6k±1 RC as an example.
Figure 21D:
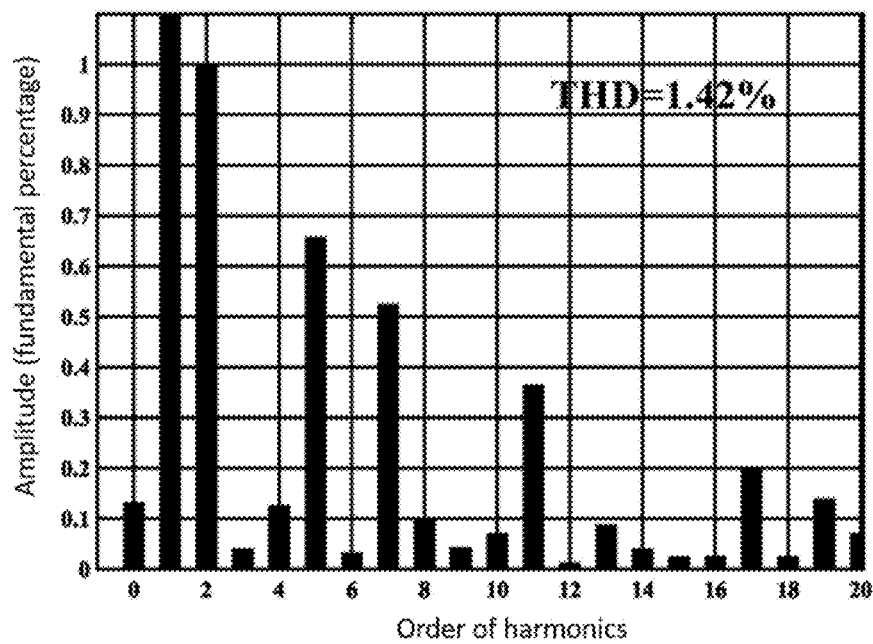
FIG. 21D is a harmonic spectrogram of a controller when the reference voltage frequency is changed from 50 Hz to 49.8 Hz, i.e. an internal model of the controller is mismatched with a periodic signal to be tracked or canceled, taking second-order 6k±1 RC as an example.

FIG. 21A-FIG. 21D show error convergence variation diagrams and harmonic spectrograms under two complex controls of a 6k±1 RC and a provided second-order 6k±1 RC which are added respectively when t=0.1 s and the repetitive control gain $k_{rc}$ is the same on the basis of an FC (state feedback controller) with the frequency changed from 50 Hz to 49.8 Hz. FIG. 21A and FIG. 21B correspond to the 6k±1 RC; FIG. 21A is the error convergence variation diagram, and FIG. 21B is the harmonic spectrogram. FIG. 21C and FIG. 21D correspond to the second-order 6k±1 RC; FIG. 21C is the error convergence variation diagram, and FIG. 21D is the harmonic spectrogram.

According to FIG. 21A-FIG. 21D, it can be seen that the error convergence time and the total harmonic distortion (THD) of the 6k±1 RC are 0.3 s and 1.59%, respectively, and the error convergence time and the total harmonic distortion (THD) of the second-order 6k±1 RC are 0.2 s and 1.42%, respectively. Therefore, when the mismatch occurs between a controller internal model and a periodic signal to be tracked or canceled near a resonance frequency point, the second-order 6k±1 RC has a higher error convergence speed and a lower total harmonic distortion.

Example 3

The nk±m-order-harmonic digital repetitive controller provided in Example 1, the h-order nk±m-order-harmonic digital repetitive controller obtained by further expansion, and the all/any-harmonic digital repetitive controller with a parallel structure may be added to a general feedback control system in an insertion or cascade manner for canceling nk±m-order-harmonic components in control errors. The specific embodiment and the simulation experiment in which the nk±m RC and the h-order nk±m-order-harmonic digital repetitive controller are added to the general feedback control system in the insertion manner are provided in Example 2. This example introduces a specific embodiment of adding to the general feedback control system in the cascade manner.

Figure 22:
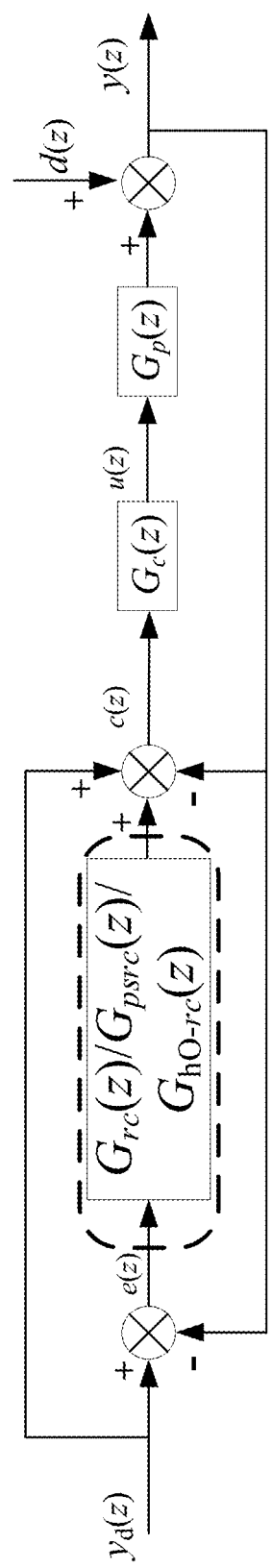
FIG. 22 is a control block diagram of adding an nk±m-order-harmonic digital repetitive controller or a multi-mode digital repetitive controller or an h-order nk±m-order-harmonic digital repetitive controller according to the disclosure to a control system in a cascade manner.

FIG. 22 shows a structural block diagram of adding an improved nk±m-order-harmonic digital repetitive controller or a repetitive controller with a parallel structure or an h-order nk±m-order-harmonic digital repetitive controller to a general feedback control system in a cascade manner. $G_{rc}(z)$ is the improved nk±m-order-harmonic digital repetitive controller; $G_c(z)$ is a conventional feedback controller; $G_p(z)$ is a control object; $y_d(z)$ is the reference input of the system and typically is the fundamental reference signal; $y(z)$ is the actual output of the system; $e(z)$ is the error of reference and actual signals and is also the input signal of the repetitive controller $G_{rc}(z)$; $c(z)$ is the output signal of the repetitive controller $G_{rc}(z)$ and is also added with the error signal $e(z)$ to serve as the input of the conventional feedback controller $G_c(z)$; $u(z)$ is the output signal of the conventional feedback controller $G_c(z)$ and is also the input signal of the control object $G_p(z)$; and $d(z)$ is the disturbance input signal of the system, which is added to the output signal of the control object $G_p(z)$ to form the actual output signal $y(z)$.

Some steps in the examples of the disclosure may be implemented through software, and corresponding software programs may be stored in a readable storage medium, such as an optical disk or a hard disk.

The foregoing descriptions are merely preferred examples of the disclosure, but are not intended to limit the disclosure. Any modification, equivalent substitution, improvement and the like made within the spirit and principle of the disclosure shall fall within the protection scope of the disclosure.

What is claimed is:

1. A repetitive controller, comprising: a repetitive control gain module, a positive feedforward gain module, a subtraction loop, a first addition loop, a second addition loop, a first time-delay module, a second time-delay module and a third time-delay module;
   wherein the first time-delay module, the second time-delay module and the third time-delay module are identical;
   wherein:
   an input end of the repetitive control gain module receives an input into the repetitive controller,
   an output end of the repetitive control gain module connected to a first input end of the first addition loop,
   an output end of the first addition loop is connected to a first input end of the second addition loop,
   an output end of the second addition loop is connected to an input end of the positive feedforward gain module and an input end of the first time-delay module,
   an output end of the positive feedforward gain module is connected to a positive input end of the subtraction loop,
   an output end of the first time-delay module is connected to a negative input end of the subtraction loop, an output end of the subtraction loop is connected to an input end of the second time-delay module,
   an output end of the second time-delay module is connected to a second input end of the first addition loop,
   an output from the repetitive controller is received from the output end of the second time-delay module,
   the output end of the positive feedforward gain module is also connected to an input end of the third time-delay module, and
   an output end of the third time-delay module is connected to a second input end of the second addition loop.

2. The repetitive controller according to claim 1, further comprising:
   a first low pass filter, a second low pass filter, a third low pass filter, and a phase lead compensation module;
   wherein the output end of the first time-delay module is connected to the negative input end of the subtraction loop through the first low pass filter,
   the output end of the second time-delay module is connected to the second input end of the first addition loop through the second low pass filter,
   the output from the repetitive controller is received from the output end of the second time-delay module through the second low pass filter and then through the phase lead compensation module,
   the output end of the positive feedforward gain module is connected to the input end of the third time-delay module through the third low pass filter.

3. A method of controlling the repetitive controller of claim 1, comprising:
   using the repetitive control gain module to perform repetitive control gain on an input quantity of the repetitive controller to obtain an output quantity of the repetitive control gain module;
   using the positive feedforward gain module to perform positive feedforward gain on an output quantity of the second addition loop to obtain an output quantity of the positive feedforward gain module;
   using the first addition loop to add the output quantity of the repetitive control gain module and an output quantity of the subtraction loop output delayed by the second time-delay module in a delay manner to obtain an output quantity of the first addition loop;
   using the second addition loop to add the output quantity of the first addition loop and the output quantity of the positive feedforward gain module output delayed by the third time-delay module to obtain an output quantity of the second addition loop;
   using the subtraction loop to subtract the output quantity of the positive feedforward gain module from the output quantity of the second addition loop output delayed by the first time-delay module to obtain the output quantity of the subtraction loop;
   using the first time-delay module to delay the output quantity of the second addition loop;
   using the second time-delay module to delay the output quantity of the subtraction loop; and
   using the third time-delay module to delay the output quantity of the positive feedforward gain module.

4. The method according to claim 3, further comprising: adjusting the repetitive control gain to adjust a speed of the repetitive controller to track or cancel specific harmonics.

5. The method according to claim 3, further comprising: determining parameters of the positive feedforward gain module according to an order of harmonics to be tracked or canceled.

6. The method according to claim 3, wherein the first, second or third time-delay module is an analog or digital time-delay module, and a transfer function of the repetitive controller is:

$$G_{rc}(s) = \frac{c(s)}{e(s)} = k_{rc} \cdot \frac{\cos\left(\frac{2\pi m}{n}\right) \cdot e^{\frac{sT_0}{n}} - 1}{e^{\frac{2sT_0}{n}} - 2\cos\left(\frac{2\pi m}{n}\right) \cdot e^{\frac{sT_0}{n}} + 1}$$

$$\text{or } G_{rc}(z) = \frac{c(z)}{e(z)} = k_{rc} \cdot \frac{\cos\left(\frac{2\pi m}{n}\right) \cdot z^{\frac{N}{n}} - 1}{z^{\frac{2N}{n}} - 2\cos\left(\frac{2\pi m}{n}\right) \cdot z^{\frac{N}{n}} + 1}$$

wherein c( ) is the output quantity of the repetitive controller, e( ) is the input quantity of the repetitive controller, $k_{rc}$ is a repetitive control gain parameter, s is a Laplace variable of a continuous time system, and z is a variable of z transformation of a discrete time system; $N=T_0/T_s$, is an integer, $T_0$ is a fundamental period, $T_0=2\pi/\omega_0=1/f_0$, $f_0$ is a fundamental frequency, $\omega_0$ is a fundamental angular frequency, $T_s$ is a sampling period, n, k and m are integers not less than zero, n≠0, and n>m.

7. A method of using the repetitive controller of claim 1, for canceling nk±m-order-harmonic components in control errors in a feedback control system, wherein a transfer function of the repetitive controller is:

$$G_{rc}(z) = \frac{k_{rc}}{2}\left[\frac{e^{j2\pi m/n} \cdot z^{-N/n} \cdot Q(z)}{1 - e^{j2\pi m/n} \cdot z^{-N/n} \cdot Q(z)} + \frac{e^{-j2\pi m/n} \cdot z^{-N/n} \cdot Q(z)}{1 - e^{-j2\pi m/n} \cdot z^{-N/n} \cdot Q(z)}\right] \cdot A(z)$$

wherein Q(z) is a low pass filter, and A(z) is a phase lead compensation module; and the feedback control system is stable when the following two conditions are met:

(1) poles of a transfer function of a closed-loop system before the repetitive controller is inserted are located in a unit circle; and (2) a repetitive control gain parameter k, in the inserted controller meets $0 < k_{rc} < 2$.

* * * * *